(12) United States Patent
Fugere

(10) Patent No.: US 12,338,821 B1
(45) Date of Patent: *Jun. 24, 2025

(54) MICRO-VOLUME DISPENSE PUMP SYSTEMS AND METHODS

(71) Applicant: DL Technology, LLC, Haverhill, MA (US)

(72) Inventor: Jeffrey P. Fugere, Hampton Falls, NH (US)

(73) Assignee: DL Technology, LLC., Haverhill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,057

(22) Filed: May 11, 2023

Related U.S. Application Data

(63) Continuation of application No. 16/872,593, filed on May 12, 2020, now Pat. No. 11,746,656.

(60) Provisional application No. 62/971,311, filed on Feb. 7, 2020, provisional application No. 62/847,287, filed on May 13, 2019.

(51) Int. Cl.
| | |
|---|---|
| *F04C 2/16* | (2006.01) |
| *F04C 2/107* | (2006.01) |
| *F16C 19/14* | (2006.01) |
| *F16C 19/36* | (2006.01) |

(52) U.S. Cl.
CPC .............. *F04C 2/16* (2013.01); *F04C 2/107* (2013.01); *F16C 19/14* (2013.01); *F16C 19/364* (2013.01); *F16C 2326/58* (2013.01); *F16C 2360/43* (2013.01)

(58) Field of Classification Search
CPC .... F16C 19/14; F16C 19/364; F16C 2326/58; F16C 2360/43; F01C 1/107; F04C 2/107; F04C 18/107
See application file for complete search history.

(56) References Cited

U.S. PATENT DOCUMENTS

| | | |
|---|---|---|
| 248,555 A | 10/1881 | Clarke |
| 537,201 A | 4/1895 | Haldeman |
| 796,256 A | 8/1905 | Sanders |
| (Continued) | | |

FOREIGN PATENT DOCUMENTS

| | | |
|---|---|---|
| EP | 0110591 | 6/1984 |
| EP | 0552488 | 7/1993 |
| WO | 0001495 | 1/2000 |

OTHER PUBLICATIONS

"Micro-Volume Dispense Pump Systems and Methods" Specification, Drawings, Claims and Prosecution History of U.S. Appl. No. 16/872,593, filed May 12, 2020, by Jeffrey P. Fugere.

(Continued)

*Primary Examiner* — Laert Dounis
(74) *Attorney, Agent, or Firm* — Onello & Mello, PC

(57) ABSTRACT

Provided is a feed screw assembly for a fluid dispense pump, comprising a feed screw; a feed screw shaft extending from the feed screw; a spanner nut about the feed screw shaft; a bearing assembly about the feed screw shaft between the spanner nut and the feed screw The bearing assembly includes an outer ring that directly abuts the spanner nut; and an inner ring that rotates inside and relative to the outer ring, wherein the inner ring is coupled to the feed screw shaft for rotating the feed screw, and wherein the inner ring is separated from the spanner nut by a gap.

13 Claims, 17 Drawing Sheets

(56) References Cited

U.S. PATENT DOCUMENTS

| | | | |
|---|---|---|---|
| 1,038,231 A | 9/1912 | Taylor et al. | |
| 1,345,965 A | 7/1920 | Shute | |
| 1,397,220 A | 11/1921 | Lord | |
| 1,453,161 A | 4/1923 | Murphy et al. | |
| 1,458,718 A | 6/1923 | Lord | |
| 1,593,016 A | 7/1926 | Campbell | |
| 1,699,236 A | 1/1929 | Goldrick | |
| 1,730,099 A | 10/1929 | Tribbett | |
| 1,745,382 A | 2/1930 | Roger | |
| 1,746,604 A | 2/1930 | Piquere | |
| 2,054,881 A | 9/1936 | Saunders | |
| 2,165,398 A | 7/1939 | Mazzanobile | |
| 2,287,716 A | 4/1941 | Whitfield | |
| 2,269,823 A | 1/1942 | Kreiselman | |
| 2,410,517 A | 11/1946 | Muller et al. | |
| 2,506,657 A | 5/1950 | Webster | |
| 2,635,016 A | 4/1953 | Doniak | |
| 2,656,070 A | 10/1953 | Linder | |
| 2,729,364 A | 1/1956 | Malko | |
| 2,751,119 A | 6/1956 | Manning, Sr. | |
| 2,834,520 A | 5/1958 | Nyden | |
| 2,855,929 A | 10/1958 | Hein | |
| 2,882,045 A * | 4/1959 | Moore | E05F 15/673 |
| | | | 200/507 |
| 2,901,153 A | 8/1959 | Collins | |
| 2,906,492 A | 9/1959 | Conrad | |
| 2,933,259 A | 4/1960 | Raskin | |
| 3,072,302 A | 1/1963 | Giovannoni et al. | |
| 3,330,294 A | 7/1967 | Manning et al. | |
| 3,342,205 A | 9/1967 | Quinto | |
| 3,344,647 A | 10/1967 | Berger | |
| 3,355,766 A | 12/1967 | Causemann | |
| 3,379,196 A | 4/1968 | Mitchell | |
| 3,394,659 A | 7/1968 | Van Alen | |
| 3,425,414 A | 2/1969 | La Roche | |
| 3,473,557 A | 10/1969 | Loe | |
| 3,507,584 A | 4/1970 | Robbins, Jr. | |
| 3,545,479 A | 12/1970 | Winston | |
| 3,618,993 A | 11/1971 | Platte | |
| 3,693,844 A | 9/1972 | Willeke | |
| 3,693,884 A | 9/1972 | Snodgrass et al. | |
| 3,732,731 A | 5/1973 | Fussell | |
| 3,732,734 A | 5/1973 | Avakian | |
| 3,734,635 A | 5/1973 | Blach et al. | |
| 3,756,730 A | 9/1973 | Spatz | |
| 3,771,476 A | 11/1973 | Heinle | |
| 3,790,128 A | 2/1974 | Hempelmann et al. | |
| 3,811,601 A | 5/1974 | Reighard et al. | |
| 3,865,281 A | 2/1975 | Byrd et al. | |
| 3,938,492 A | 2/1976 | Mercer, Jr. | |
| 3,945,569 A | 3/1976 | Sperry | |
| 3,963,151 A | 6/1976 | North, Jr. | |
| 3,963,884 A | 6/1976 | Pollock | |
| 3,975,058 A * | 8/1976 | York | B65G 53/48 |
| | | | 406/60 |
| 3,985,032 A | 10/1976 | Avakian | |
| 4,004,715 A | 1/1977 | Williams et al. | |
| 4,040,875 A | 8/1977 | Noble | |
| 4,042,201 A | 8/1977 | O'Callaghan | |
| 4,072,330 A | 2/1978 | Brysch | |
| 4,077,180 A | 3/1978 | Agent et al. | |
| 4,116,766 A | 9/1978 | Poindexter et al. | |
| 4,168,942 A | 9/1979 | Firth | |
| 4,197,070 A | 4/1980 | Ko | |
| 4,239,462 A | 12/1980 | Dach et al. | |
| 4,258,862 A | 3/1981 | Thorsheim | |
| 4,312,630 A | 1/1982 | Travaglini | |
| 4,338,925 A | 7/1982 | Miller | |
| 4,339,840 A | 7/1982 | Monson | |
| 4,341,329 A | 7/1982 | Kuemmerer et al. | |
| 4,346,849 A | 8/1982 | Rood | |
| 4,377,894 A | 3/1983 | Yoshida | |
| 4,386,483 A | 6/1983 | Schlaefli | |
| 4,397,407 A | 8/1983 | Skoupi et al. | |
| 4,400,708 A | 8/1983 | Sachs | |
| 4,408,699 A | 10/1983 | Stock | |
| 4,454,745 A | 6/1984 | Cudini | |
| 4,465,212 A | 8/1984 | Boone | |
| 4,465,922 A | 8/1984 | Kolibas | |
| 4,471,890 A | 9/1984 | Dougherty | |
| 4,513,190 A | 4/1985 | Ellett et al. | |
| 4,523,741 A | 6/1985 | Chandler | |
| 4,572,103 A | 2/1986 | Engel | |
| 4,579,286 A | 4/1986 | Stoudt | |
| 4,584,964 A | 4/1986 | Engel | |
| 4,607,766 A | 8/1986 | Jones | |
| 4,610,377 A | 9/1986 | Rasmussen | |
| 4,629,099 A | 12/1986 | Jones | |
| 4,673,109 A | 6/1987 | Cassia | |
| 4,705,218 A | 11/1987 | Daniels | |
| 4,705,611 A | 11/1987 | Grimes et al. | |
| 4,729,544 A | 3/1988 | Baumann | |
| 4,743,243 A | 5/1988 | Vaillancourt | |
| 4,763,755 A | 8/1988 | Murray | |
| 4,785,996 A | 11/1988 | Ziecker et al. | |
| 4,803,124 A | 2/1989 | Kunz | |
| 4,836,422 A | 6/1989 | Rosenberg | |
| 4,859,073 A | 8/1989 | Howseman, Jr. et al. | |
| 4,917,274 A | 4/1990 | Asa et al. | |
| 4,919,204 A | 4/1990 | Baker et al. | |
| 4,935,015 A | 6/1990 | Hall | |
| 4,941,428 A | 7/1990 | Engel | |
| 4,969,602 A | 11/1990 | Scholl | |
| 4,974,755 A | 12/1990 | Sonntag | |
| 5,002,228 A | 3/1991 | Su | |
| 5,010,930 A | 4/1991 | Colu | |
| 5,052,591 A | 10/1991 | Divall et al. | |
| 5,065,910 A | 11/1991 | Fie | |
| 5,090,814 A | 2/1992 | Petcen | |
| 5,106,291 A | 4/1992 | Gellert | |
| 5,130,710 A | 7/1992 | Salazar | |
| 5,148,946 A | 9/1992 | Mizuta et al. | |
| 5,161,427 A | 11/1992 | Fukuda et al. | |
| 5,172,833 A | 12/1992 | Faulkner, III | |
| 5,176,803 A | 1/1993 | Barbuto et al. | |
| 5,177,901 A | 1/1993 | Smith | |
| 5,186,886 A | 2/1993 | Zerinvary et al. | |
| RE34,197 E | 3/1993 | Engel | |
| 5,199,169 A | 4/1993 | Bonzak | |
| 5,217,154 A | 6/1993 | Elwood et al. | |
| 5,226,625 A | 7/1993 | Hanna | |
| 5,236,162 A | 8/1993 | Desjardins | |
| 5,261,610 A | 11/1993 | Waryu et al. | |
| 5,265,773 A | 11/1993 | Harada | |
| 5,287,762 A | 2/1994 | Bonzak | |
| 5,344,052 A | 9/1994 | Divall et al. | |
| 5,348,453 A | 9/1994 | Baran et al. | |
| 5,375,743 A | 12/1994 | Soudan | |
| 5,407,101 A | 4/1995 | Hubbard | |
| 5,452,824 A | 9/1995 | Danek et al. | |
| 5,480,487 A | 1/1996 | Figini et al. | |
| 5,535,919 A | 7/1996 | Ganzer et al. | |
| 5,553,742 A | 9/1996 | Maruyama et al. | |
| 5,564,606 A | 10/1996 | Engel | |
| 5,567,300 A | 10/1996 | Datta et al. | |
| 5,569,934 A | 10/1996 | Fujii et al. | |
| 5,624,045 A | 4/1997 | Highsmith et al. | |
| 5,637,815 A | 6/1997 | Takahata et al. | |
| 5,685,853 A | 11/1997 | Bonnet | |
| 5,699,934 A | 12/1997 | Kolcun et al. | |
| 5,765,730 A | 6/1998 | Richter | |
| 5,785,068 A | 7/1998 | Sasaki et al. | |
| 5,795,390 A | 8/1998 | Cavallaro | |
| 5,803,661 A | 9/1998 | Lemelson | |
| 5,814,022 A | 9/1998 | Antanavich et al. | |
| 5,819,983 A | 10/1998 | White et al. | |
| 5,823,747 A | 10/1998 | Ciavarini et al. | |
| 5,833,851 A | 11/1998 | Adams et al. | |
| 5,837,892 A | 11/1998 | Cavallaro et al. | |
| 5,886,494 A | 3/1999 | Prentice et al. | |
| 5,894,147 A | 4/1999 | Cacharelis | |
| 5,903,125 A | 5/1999 | Prentice et al. | |
| 5,904,377 A | 5/1999 | Throup | |
| 5,918,648 A | 7/1999 | Carr et al. | |

(56) References Cited

U.S. PATENT DOCUMENTS

| | | |
|---|---|---|
| 5,925,187 A | 7/1999 | Freeman et al. |
| 5,927,560 A | 7/1999 | Lewis et al. |
| 5,931,355 A | 8/1999 | Jefferson |
| 5,947,022 A | 9/1999 | Freeman et al. |
| 5,947,509 A | 9/1999 | Ricks et al. |
| 5,957,343 A | 9/1999 | Cavallaro |
| 5,964,378 A | 10/1999 | Sperry et al. |
| 5,971,227 A | 10/1999 | White et al. |
| 5,984,147 A | 11/1999 | Van Ngo |
| 5,985,029 A | 11/1999 | Purcell |
| 5,985,206 A | 11/1999 | Zabala et al. |
| 5,985,216 A | 11/1999 | Rens et al. |
| 5,988,530 A | 11/1999 | Rockefeller |
| 5,992,688 A | 11/1999 | Lewis et al. |
| 5,992,698 A | 11/1999 | Copeland et al. |
| 5,992,704 A | 11/1999 | Jager-Waldau |
| 5,993,183 A | 11/1999 | Laskaris et al. |
| 5,993,518 A | 11/1999 | Tateyama |
| 5,995,788 A | 11/1999 | Baek |
| 6,007,631 A | 12/1999 | Prentice et al. |
| 6,017,392 A | 1/2000 | Cavallaro |
| 6,025,689 A | 2/2000 | Prentice et al. |
| 6,068,202 A | 5/2000 | Hynes et al. |
| 6,082,289 A | 7/2000 | Cavallaro |
| 6,085,943 A | 7/2000 | Cavallaro et al. |
| 6,088,892 A | 7/2000 | Bertsch et al. |
| 6,093,251 A | 7/2000 | Carr et al. |
| 6,112,588 A | 9/2000 | Cavallaro et al. |
| 6,119,566 A | 9/2000 | Yan et al. |
| 6,119,895 A | 9/2000 | Fugere et al. |
| 6,123,167 A | 9/2000 | Miller et al. |
| 6,126,039 A | 10/2000 | Cline et al. |
| 6,132,396 A | 10/2000 | Antanavich et al. |
| 6,157,157 A | 12/2000 | Prentice et al. |
| 6,193,783 B1 | 2/2001 | Sakamoto et al. |
| 6,196,477 B1 | 3/2001 | Halltorp et al. |
| 6,196,521 B1 | 3/2001 | Hynes et al. |
| 6,199,566 B1 | 3/2001 | Gazewood |
| 6,206,964 B1 | 3/2001 | Purcell et al. |
| 6,207,220 B1 | 3/2001 | Doyle et al. |
| 6,214,117 B1 | 4/2001 | Prentice et al. |
| 6,216,917 B1 | 4/2001 | Crouch |
| 6,224,671 B1 | 5/2001 | Cavallaro |
| 6,224,675 B1 | 5/2001 | Prentice et al. |
| 6,234,358 B1 * | 5/2001 | Romine .............. B23K 3/0607 222/413 |
| 6,234,858 B1 | 5/2001 | Nix |
| 6,250,515 B1 | 6/2001 | Newbold et al. |
| 6,253,957 B1 | 7/2001 | Messerly et al. |
| 6,253,972 B1 | 7/2001 | Devito et al. |
| 6,257,444 B1 | 7/2001 | Everett |
| 6,258,165 B1 | 7/2001 | Cavallaro |
| 6,291,016 B1 | 9/2001 | Donges et al. |
| 6,299,031 B1 | 10/2001 | Cavallaro et al. |
| 6,299,078 B1 | 10/2001 | Fugere |
| 6,311,740 B1 | 11/2001 | Sperry et al. |
| 6,322,854 B1 | 11/2001 | Purcell et al. |
| 6,324,973 B2 | 12/2001 | Rossmeisl et al. |
| 6,354,471 B2 | 3/2002 | Fujii |
| 6,371,339 B1 | 4/2002 | White et al. |
| 6,378,737 B1 | 4/2002 | Cavallaro et al. |
| 6,383,292 B1 | 5/2002 | Brand et al. |
| 6,386,396 B1 | 5/2002 | Strecker |
| 6,391,378 B1 | 5/2002 | Carr et al. |
| 6,395,334 B1 | 5/2002 | Prentice et al. |
| 6,412,328 B1 | 7/2002 | Cavallaro et al. |
| 6,428,852 B1 | 8/2002 | Pillion et al. |
| 6,450,416 B1 | 9/2002 | Berg et al. |
| 6,453,810 B1 | 9/2002 | Rossmeisl et al. |
| 6,511,301 B1 | 1/2003 | Fugere |
| 6,514,569 B1 | 2/2003 | Crouch |
| 6,540,832 B2 | 4/2003 | Cavallaro |
| 6,541,063 B1 | 4/2003 | Prentice et al. |
| 6,547,167 B1 | 4/2003 | Fugere |
| 6,551,557 B1 | 4/2003 | Rose et al. |
| 6,562,406 B1 | 5/2003 | Chikahisa et al. |
| 6,581,906 B2 | 6/2003 | Pott et al. |
| 6,609,902 B1 | 8/2003 | Blais et al. |
| 6,619,198 B2 | 9/2003 | Rossmeisl et al. |
| 6,626,097 B2 | 9/2003 | Rossmeisl et al. |
| 6,644,517 B2 | 11/2003 | Thiel et al. |
| 6,719,174 B1 | 4/2004 | Swift |
| 6,729,507 B2 | 5/2004 | Nagahata et al. |
| 6,736,900 B2 | 5/2004 | Isogai et al. |
| 6,739,483 B2 | 5/2004 | White et al. |
| 6,775,879 B2 | 8/2004 | Bibeault et al. |
| 6,803,661 B2 | 10/2004 | Thakar et al. |
| 6,828,167 B2 | 12/2004 | Kim |
| 6,832,733 B2 | 12/2004 | Engel |
| 6,851,923 B1 | 2/2005 | Fugere |
| 6,866,881 B2 | 3/2005 | Prentice et al. |
| 6,886,720 B2 | 5/2005 | Penn |
| 6,892,959 B1 | 5/2005 | Fugere |
| 6,896,202 B1 | 5/2005 | Fugere |
| 6,957,783 B1 | 10/2005 | Fugere |
| 6,981,664 B1 | 1/2006 | Fugere |
| 6,983,867 B1 | 1/2006 | Fugere |
| 6,994,234 B2 | 2/2006 | De Leeuw |
| 7,000,853 B2 | 2/2006 | Fugere |
| 7,018,477 B2 | 3/2006 | Engel |
| 7,028,867 B2 | 4/2006 | Acum et al. |
| 7,128,731 B2 | 10/2006 | Aramata et al. |
| 7,176,746 B1 | 2/2007 | Wang et al. |
| 7,178,745 B1 | 2/2007 | Fugere |
| 7,190,891 B2 | 3/2007 | Verrilli |
| 7,207,498 B1 | 4/2007 | Fugere |
| 7,231,716 B2 | 6/2007 | Verilli |
| 7,293,691 B2 | 11/2007 | Rossmeisl et al. |
| 7,325,994 B2 | 2/2008 | Liberatore |
| 7,331,482 B1 | 2/2008 | Fugere |
| RE40,539 E | 10/2008 | Fugere |
| 7,434,753 B2 | 10/2008 | Verrilli |
| 7,448,857 B1 | 11/2008 | Fugere |
| 7,614,529 B2 | 11/2009 | Bolyard, Jr. et al. |
| 7,677,417 B2 | 3/2010 | Leiner et al. |
| 7,694,857 B1 | 4/2010 | Fugere |
| 7,744,022 B1 | 6/2010 | Fugere |
| 7,753,253 B2 | 7/2010 | Terada et al. |
| 7,762,088 B2 | 7/2010 | Fiske et al. |
| 7,762,480 B1 | 7/2010 | Fugere |
| 7,874,456 B2 | 1/2011 | Bolyard, Jr. et al. |
| 7,905,945 B1 | 3/2011 | Fugere |
| 7,997,446 B2 | 8/2011 | Engel |
| 8,056,833 B1 | 11/2011 | Fugere |
| 8,197,582 B1 | 6/2012 | Fugere |
| 8,220,669 B1 | 7/2012 | Fugere |
| 8,220,699 B2 | 7/2012 | Dong et al. |
| 8,240,335 B1 | 8/2012 | Broberg et al. |
| 8,281,963 B2 | 10/2012 | Liu |
| 8,353,429 B2 | 1/2013 | Zhou et al. |
| 8,448,818 B2 | 5/2013 | Ikushima |
| 8,480,015 B1 | 7/2013 | Fugere |
| 8,561,842 B2 | 10/2013 | Pizzacalla et al. |
| 8,690,084 B1 | 4/2014 | Fugere |
| 8,701,946 B1 | 4/2014 | Fugere |
| 8,707,559 B1 | 4/2014 | Fugere |
| 8,710,946 B2 | 4/2014 | Pintgen et al. |
| 8,864,055 B2 | 10/2014 | Fugere |
| 9,108,215 B1 | 8/2015 | Fugere |
| 9,180,482 B1 | 11/2015 | Fu |
| 9,228,582 B1 | 1/2016 | Fugere |
| 9,242,770 B2 | 1/2016 | Fugere |
| 9,272,303 B1 | 3/2016 | Fugere |
| 9,486,830 B1 | 11/2016 | Fugere |
| 9,573,156 B1 | 2/2017 | Fugere |
| 9,725,225 B1 | 8/2017 | Fugere |
| 9,833,807 B1 | 12/2017 | Fugere |
| 9,833,808 B1 | 12/2017 | Fugere |
| 10,105,729 B1 | 10/2018 | Fugere |
| 10,370,172 B1 | 8/2019 | Fugere |
| 10,583,454 B1 | 3/2020 | Fugere |
| 10,722,914 B1 | 7/2020 | Fugere |
| 10,814,344 B1 | 10/2020 | Fugere |
| 11,035,412 B2 | 6/2021 | Risko Cattell et al. |

(56) References Cited

U.S. PATENT DOCUMENTS

| | | |
|---|---|---|
| 11,059,654 B1 | 7/2021 | Fugere |
| 11,292,025 B1 | 4/2022 | Fugere |
| 11,364,517 B1 | 6/2022 | Fugere |
| 11,370,596 B1 | 6/2022 | Fugere |
| 11,420,225 B1 | 8/2022 | Fugere |
| 11,648,581 B1 | 5/2023 | Fugere |
| 12,017,247 B1 | 6/2024 | Fugere |
| 2001/0011506 A1 | 8/2001 | Rossmeisl et al. |
| 2001/0020629 A1 | 9/2001 | Fujii |
| 2001/0020787 A1 | 9/2001 | Pott et al. |
| 2002/0007227 A1 | 1/2002 | Prentice et al. |
| 2002/0007741 A1 | 1/2002 | Rossmeisl et al. |
| 2002/0008118 A1 | 1/2002 | Cavallaro |
| 2002/0020350 A1 | 2/2002 | Prentice et al. |
| 2002/0084290 A1 | 7/2002 | Materna |
| 2002/0088269 A1 | 7/2002 | Cavallaro et al. |
| 2003/0000462 A1 | 1/2003 | Prentice et al. |
| 2003/0038190 A1 | 2/2003 | Newbold et al. |
| 2003/0066546 A1 | 4/2003 | Bibeault et al. |
| 2003/0071149 A1 | 4/2003 | Verilli |
| 2003/0084845 A1 | 5/2003 | Prentice et al. |
| 2003/0091727 A1 | 5/2003 | Prentice et al. |
| 2003/0097941 A1 | 5/2003 | Rossmeisl et al. |
| 2003/0125671 A1 | 7/2003 | Aramata et al. |
| 2003/0132243 A1 | 7/2003 | Engel |
| 2003/0132443 A1 | 7/2003 | Kim |
| 2003/0155384 A1 | 8/2003 | Nagahata et al. |
| 2004/0089228 A1 | 5/2004 | Prentice et al. |
| 2004/0140371 A1 | 7/2004 | Engel |
| 2004/0142099 A1 | 7/2004 | Rossmeisl et al. |
| 2004/0195278 A1 | 10/2004 | De Leeuw |
| 2004/0245673 A1 | 12/2004 | Allsop |
| 2004/0262824 A1 | 12/2004 | Andersson et al. |
| 2005/0072815 A1 | 4/2005 | Carew et al. |
| 2005/0095365 A1 | 5/2005 | Acum et al. |
| 2005/0100457 A1 | 5/2005 | Fugere |
| 2005/0103886 A1 | 5/2005 | Verrilli |
| 2005/0135869 A1 | 6/2005 | Liberatore |
| 2005/0158042 A1 | 7/2005 | Verrilli |
| 2006/0037972 A1 | 2/2006 | Leiner et al. |
| 2006/0157517 A1 | 7/2006 | Fiske et al. |
| 2006/0278666 A1 | 12/2006 | Wang et al. |
| 2007/0111400 A1 | 5/2007 | Terada et al. |
| 2007/0145164 A1 | 6/2007 | Ahmadi et al. |
| 2007/0267450 A1 | 11/2007 | Bolyard, Jr. et al. |
| 2008/0273938 A1* | 11/2008 | Rowe .................. F16B 23/0084 411/338 |
| 2009/0095825 A1 | 4/2009 | Ahmadi et al. |
| 2009/0266840 A1 | 10/2009 | Brand et al. |
| 2010/0065306 A1 | 3/2010 | Pintgen et al. |
| 2010/0276522 A1 | 11/2010 | Fugere |
| 2010/0294810 A1 | 11/2010 | Ikushima |
| 2011/0095056 A1 | 4/2011 | Liu |
| 2011/0315906 A1 | 12/2011 | Ohuchi et al. |
| 2012/0048888 A1 | 3/2012 | Pizzacalla et al. |
| 2013/0105597 A1 | 5/2013 | Dunlap et al. |
| 2014/0319402 A1 | 10/2014 | Gatten |
| 2016/0082468 A1 | 3/2016 | Fugere |
| 2020/0109746 A1 | 4/2020 | Risko Cattell et al. |

OTHER PUBLICATIONS

Karassik, et al., "Pump Hand Book" Second Ed., McGraw Hill Inc., 1986, p. 9.30 (Resubmission of reference cited in IDS submitted Aug. 14, 2023, uploaded with reference copy).

Micro-Mechanics Design Specifications, May 1999 (Resubmission of reference cited in IDS submitted Aug. 14, 2023, uploaded with reference copy).

Nordson EFD, "736HPA-NV High Pressure Dispense Valve Installation Guide", Jan. 2011 (Resubmission of reference cited in IDS submitted Aug. 14, 2023, uploaded with reference copy).

Sela, Uri, et al., "Dispensing Technology: The Key to High-Quality, High-Speed, Die-Bonding", Microelectronics Manufacturing Technology, Feb. 1991 (Resubmission of reference cited in IDS submitted Aug. 14, 2023, uploaded with reference copy).

Techon Systems, "Local Dispensing Solutions Worldwide: Dispensing Adhesives Material Can Be Challenging", downloaded from the internet on Nov. 4, 2011 (http://www.techconsystems.com/dispensing-adhesives) (Resubmission of reference cited in IDS submitted Aug. 14, 2023, uploaded with reference copy).

Ulrich, Rene, "Epoxy Die Attach: The Challenge of Big Chips", Semiconductor International, Oct. 1994 (Resubmission of reference cited in IDS submitted Aug. 14, 2023, uploaded with reference copy).

* cited by examiner

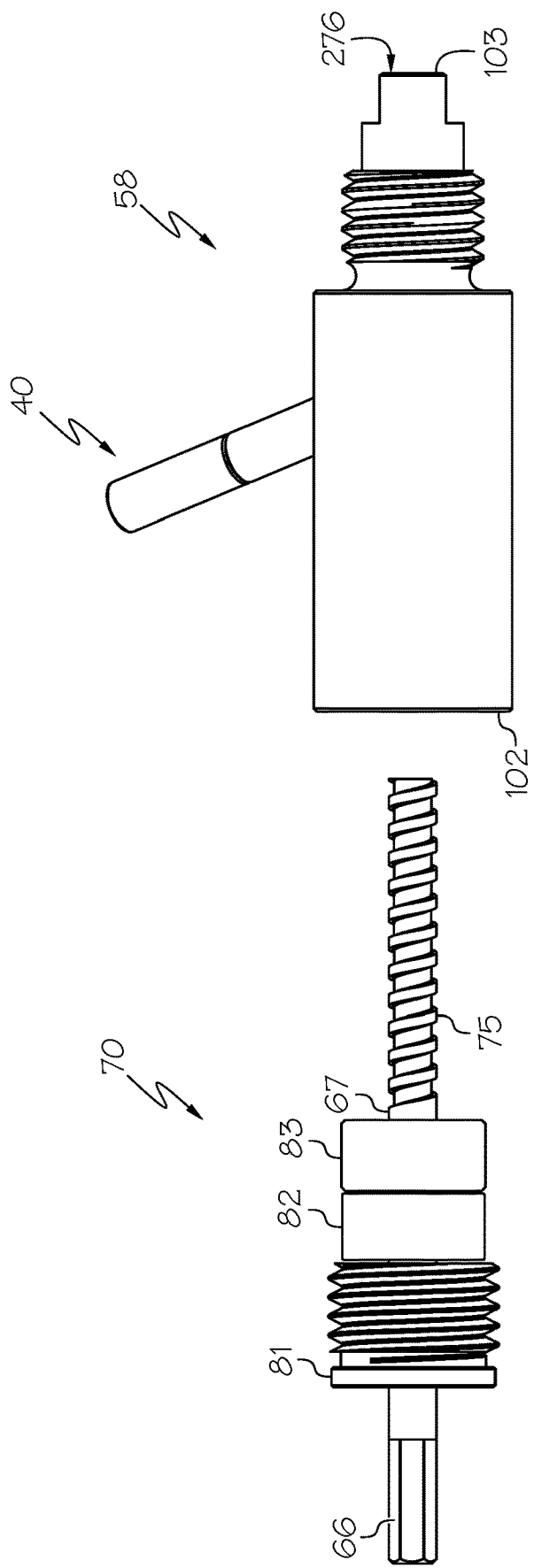

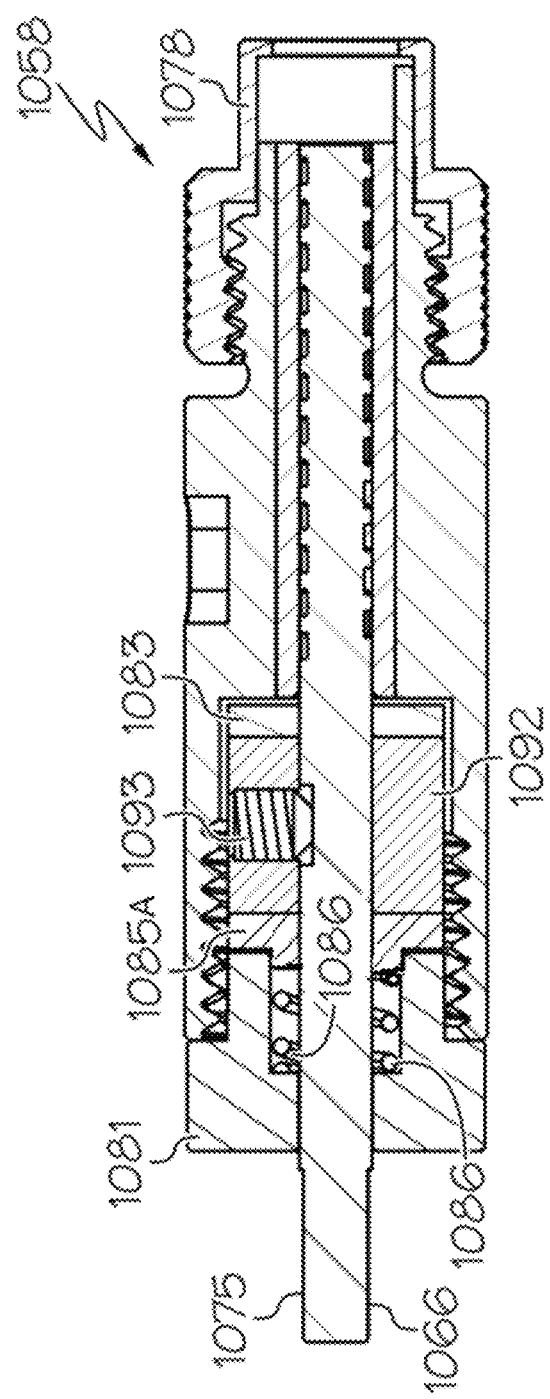

MICRO-VOLUME DISPENSE PUMP SYSTEMS AND METHODS

RELATED APPLICATIONS

This application is a continuation application of U.S. Ser. No. 16/872,593, filed May 12, 2020, entitled "Micro-Volume Dispense Pump Systems and Methods", which claims the benefit of U.S. Provisional Patent Application No. 62/847,287, filed May 13, 2019, entitled "Micro-Volume Dispense Pump Systems and Methods," and U.S. Provisional Patent Application No. 62/971,311, filed Feb. 7, 2020, entitled "Micro-Volume Dispense Pump Systems and Methods," the contents of each are incorporated herein by reference in their entirety.

This application is related to:
U.S. Pat. No. 6,547,167 issued Apr. 15, 2003,
U.S. Pat. No. 6,981,664 issued Jan. 3, 2006,
U.S. Pat. No. 6,511,301 issued Jan. 28, 2003,
U.S. Pat. No. 6,957,783 issued Oct. 25, 2005,
U.S. Pat. No. 6,892,959 issued May 17, 2005,
U.S. Pat. No. 6,983,867 issued Jan. 10, 2006,
U.S. Pat. No. 7,331,482 issued Feb. 19, 2008,
U.S. Pat. No. 8,707,559 issued Apr. 29, 2014,
U.S. Pat. No. 8,864,055 issued Oct. 21, 2014, and
U.S. Pat. No. 9,725,225 issued Aug. 8, 2017,
the contents of each incorporated herein by reference in its entirety.

TECHNICAL FIELD

The present inventive concepts generally relate to the field of fluid dispense pump systems, and more particularly, to systems and methods for dispensing micro-volumes of material.

BACKGROUND

Contemporary micro-volume dispense pumps are suited for outputting small amounts of fluid to a substrate, and are particularly useful in applications that include the assembly of small electronic components in personal computers, smartphones, tablets, and other consumer electronics devices.

During a dispensing operation, a pump transports glue, resin, paste, epoxy, or other adhesives, or other fluid material to a dispense tip attached to the end of the pump. The dispense tip, also referred to as a needle, nozzle, or pin, in turn outputs a small volume of the fluid material on the substrate as needed.

The density of components assembled for an electronic device continues to increase, while the size of the components continues to decrease. It is therefore desirable for dispense pump systems to deposit precise volumes of fluid materials at smaller dimensions and high accuracy and consistency.

SUMMARY

Embodiments of the present inventive concepts are directed to fluid dispense pumps and systems and to methods for manufacturing fluid dispense pumps.

In one aspect, provided is a feed screw assembly for a fluid dispense pump, comprising: a feed screw; a feed screw shaft extending from the feed screw; a spanner nut about the feed screw shaft; a bearing assembly about the feed screw shaft between the spanner nut and the feed screw The bearing assembly includes an outer ring that directly abuts the spanner nut; and an inner ring that rotates inside and relative to the outer ring, wherein the inner ring is coupled to the feed screw shaft for rotating the feed screw, and wherein the inner ring is separated from the spanner nut by a gap.

In some embodiments, the feed screw assembly further comprises a sleeve that is press-fit to the feed screw shaft, wherein the inner ring of the bearing drive is press-fit to the sleeve.

In some embodiments, the feed screw assembly further comprises a washer element about an opposite side of the bearing assembly as the spanner nut, wherein the washer element directly abuts the outer ring of the bearing assembly at a side of the outer ring opposite the spanner nut, and wherein the inner ring is separated from the washer by a gap.

In some embodiments, the feed screw shaft is an indexed shaft for insertion into an axle of a motor for driving the feed screw.

In some embodiments, the spanner nut includes an amount of compression between the spanner nut and the bearing assembly to reduce or prevent axial play along a longitudinal axis of the feed screw.

In some embodiments, the feed screw assembly further comprises a load washer between the spanner nut and the bearing assembly.

In some embodiments, the bearing assembly includes a tapered roller thrust bearing.

In another aspect, provided is a fluid dispense pump, comprising: a pump housing; a cartridge body positioned along an axis, the cartridge body comprising a chamber and a feed aperture extending through a surface of the cartridge body to the chamber; and a feed screw assembly in the chamber of the cartridge body. The feed screw assembly comprises a feed screw; a feed screw shaft extending from the feed screw; a spanner nut about the feed screw shaft, the spanner nut coupled to an end of the cartridge body for maintaining the feed screw along a longitudinal axis in the chamber of the cartridge body; and a bearing assembly about the feed screw shaft between the spanner nut and the feed screw. The bearing assembly includes an outer ring that directly abuts the spanner nut; and an inner ring that rotates inside and relative to the outer ring, wherein the inner ring is coupled to the feed screw shaft for rotating the feed screw about the longitudinal axis, and wherein the inner ring is separated from the spanner nut by a gap.

In some embodiments, the spanner nut is threaded for mating with a threaded interior region at the end of the cartridge body.

In some embodiments, the fluid dispense pump further comprises a fluid path from the feed aperture of the cartridge body to an outlet at a distal end of the feed screw.

In some embodiments, the outer ring is stationary in the chamber of the cartridge body, and the inner ring rotates the feed screw about the longitudinal axis in the chamber relative to the outer ring.

In some embodiments, the inner feed screw shaft, the inner ring, and the outer ring are concentric about the longitudinal axis.

In some embodiments, the fluid dispense pump further comprises a sleeve that is press-fit to the feed screw shaft, wherein the inner ring of the bearing drive is press-fit to the sleeve.

In some embodiments, the fluid dispense pump further comprises a washer element about an opposite side of the bearing assembly as the spanner nut, wherein the washer element directly abuts the outer ring of the bearing assembly, and wherein the inner ring is separated from the washer by a gap.

In some embodiments, the feed screw shaft is an indexed shaft for insertion into an axle of a motor for driving the feed screw.

In some embodiments, the cartridge assembly is removably coupled to a cartridge socket at a bottom portion of the pump housing.

In some embodiments, the fluid dispense pump further comprises a cartridge locking device constructed and arranged to secure the cartridge at the cartridge socket.

In some embodiments, the fluid dispense pump further comprised a motor coupled to the pump housing, the motor rotating the feed screw inside the cartridge assembly.

In some embodiments, the fluid dispense pump further comprises a load washer directly abutting the outer ring between the spanner nut and the bearing assembly.

In some embodiments, bearing assembly includes a tapered roller thrust bearing.

In another aspect, provided is a method for assembling a feed screw assembly for a fluid dispense pump, comprising: press-fitting a sleeve about a feed screw shaft; press-fitting a rotatable inner ring of a bearing assembly about the sleeve, the bearing assembly further comprising an outer ring, wherein the inner ring rotates inside and relative to the outer ring; and positioning a spanner nut about the feed screw shaft so that the outer ring directly abuts the spanner nut and the inner ring is separated from the spanner nut by a gap.

In another aspect, provided is a spanner nut assembly of a fluid dispense pump system, comprising: a spanner nut constructed and arranged for securing a feed screw inside a housing of the fluid dispense pump system; and a coil spring about the feed screw that reduces a source of axial play along a longitudinal axis of the feed screw during a fluid dispensing operation that includes a rotation of the feed screw about the longitudinal axis.

In another aspect, provided is a cartridge assembly of a fluid dispense pump system, comprising a cartridge body positioned along an axis, the cartridge body comprising a chamber and a feed aperture extending through a surface of the cartridge body to the chamber; a feed screw in the chamber of the cartridge body; a spanner nut about the feed screw shaft and coupled to an end of the cartridge body for maintaining the feed screw along a longitudinal axis in the chamber of the cartridge body; a bearing assembly about the feed screw shaft between the spanner nut and the feed screw; and a coil spring about the feed screw between the spanner nut and the bearing assembly that reduces a source of axial play along a longitudinal axis of the feed screw during a fluid dispensing operation that includes a rotation of the feed screw about the longitudinal axis.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 2A is a perspective view of a cartridge assembly and a feed screw assembly of a fluid dispense pump system, in accordance with some embodiments;

FIG. 10F is a cross-sectional side view of the cartridge assembly of FIGS. 10A-10E in accordance with another embodiment.

DETAILED DESCRIPTION OF EMBODIMENTS

Figure 1:
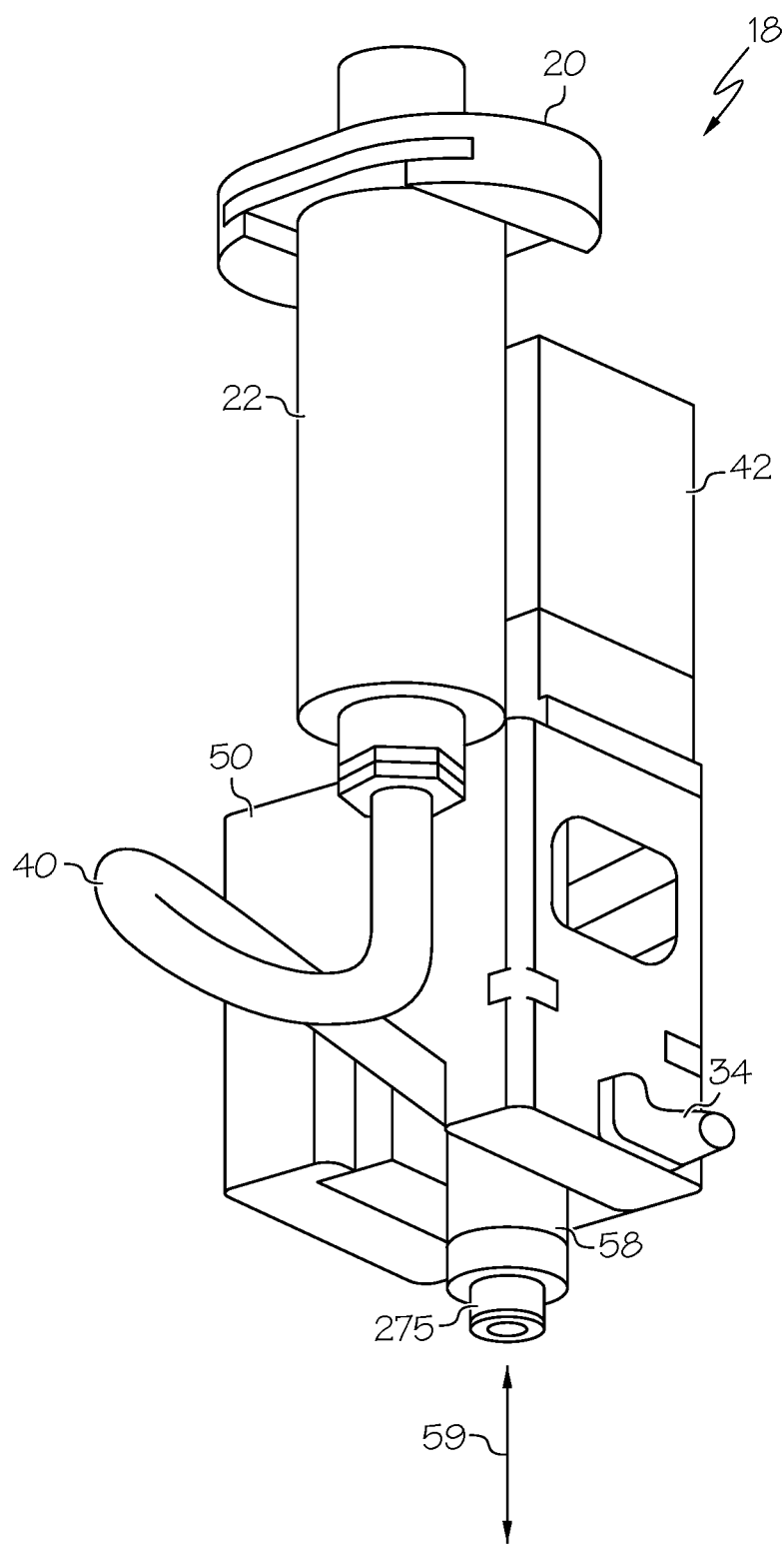
FIG. 1 is a perspective view of a fluid dispense pump system, in accordance with some embodiments of the present inventive concepts.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Contemporary dispense pumps typically include a feed screw that is disposed longitudinally through the center of a chamber of a pump housing and transports fluid material in Archimedes principle fashion from an inlet to a dispense needle attached to the housing outlet. A motor drives the feed screw to transfer the fluid material entering a chamber from the inlet to the dispense tip for output.

The ever-increasing demand for the micro volume dispensing of dot arrays, lines, and custom patterns in semiconductor packaging, electronics assembly, medical device, and electro-mechanical applications, or other related applications requires a pump that deposits precise volumes of fluid materials at dimensions acceptable for such applications.

Conventional pumps typically include a ring collar that is attached to an auger shaft. In configurations where the auger is housed in a cartridge which in turn is inserted into a pump housing, the collar is sandwiched between a threaded spanner nut that secures the feed screw auger inside the cartridge and a washer positioned about the auger. A gap or clearance is typically present between the collar and spanner nut to allow for an uninhibited rotation of the auger screw. However, the clearance provides for an excessive amount of radial and/or axial play at the collar, which can result in an undesirable "floating" movement of the feed screw inside the cartridge assembly which in turn can cause the threads of the feed screw during helical rotation to pass in front of the cartridge inlet in an inconsistent manner because of the vertical movement of the auger due to the clearance. This can contribute to the "balling" and clogging of material along the fluid path from the cartridge inlet to the dispense tip outlet. In addition, undesirable changes in pressure with respect to the transfer of material along the feed path from inlet to outlet may also occur. The foregoing may result in an inaccurate release of fluid material at the outlet, for example, imprecise fluid output patterns of periodic inconsistent volume dimensions during rotation of the feed screw in applications where precise material dispensing control and repeatability are paramount, such as electronic component manufacturing processes.

FIG. 1 is a perspective view of a fluid dispense pump system 18, in accordance with some embodiments of the present inventive concepts. With reference to FIG. 1, an embodiment of the dispensing pump 18 comprises a motor 42, a pump housing 50, and a removable cartridge assembly 58 coupled to the housing 50.

Figure 2B:
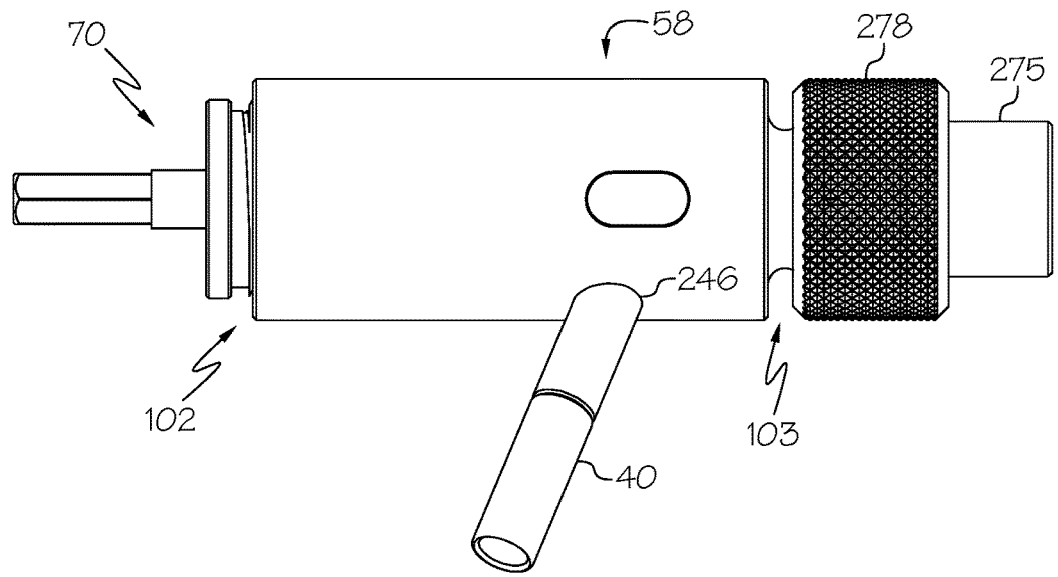
FIG. 2B is a perspective view of the feed screw assembly of FIG. 2A coupled to the cartridge assembly.

In some embodiments, the motor 42 is a brushless closed-loop AC or DC servo motor or related position-controlled motor. The motor 42 can alternatively be a stepper motor, a linear motor, or other motor known to those of ordinary skill in the art. The motor 42 includes a drive axle which operates to drive a helical feed screw 75 (shown in FIG. 2A) or related auger or the like in the cartridge assembly 58 (described below), which in turn delivers a source of fluid material to a dispense tip 275 or a needle or the like that is coupled to an end of the cartridge assembly 58. The dispense tip 275 can be held in place by a needle nut 278 (shown in FIG. 2B) coupled to the fluid shaft at the end of the cartridge assembly 58, but not limited thereto. The dispense tip 275 can be a fixed-z or floating-z dispensing type, a Luer-type, or other type known to those of ordinary skill in the art, and therefore, the needle nut 278 may be optional in some configurations. The rotary position, rotational velocity, and acceleration/deceleration of the feed screw can be readily controlled by the motor 42 with high precision over its entire motion, from initiation to completion of a dispensing operation. An optional planetary-gear transmission box may be provided to step down the available motor positions, thereby providing additional control over an angular position of the feed screw. The motor 42 can include an encoder (not shown) that provides for precise control over indexed angular, or rotational, positions, an angular velocity, and/or an angular acceleration of the motor 42.

The pump housing 50 comprises a machined or die cast body having an opening at a top portion for receiving an axle of the motor or optional transmission box. The interior of the housing 52 is hollow for receiving a cartridge assembly 58 that extends through the housing 50 from an opening at a bottom portion, upward to the top portion, where an indexed shaft 66 of the feed screw 75 interfaces with the motor drive axle or transmission box drive axle. The indexed shaft 66 is at an opposite end of the threaded feed screw 75, and, adapted to register with the axle of the motor 42 shown in FIG. 1. In some embodiments, a position of the indexed portion 66 of the shaft 67 is adjustable over a range of discrete positions corresponding to indexed positions of the motor 42.

In some embodiments, a cartridge release lever 34 is rotatably mounted to the housing 50 and is operable to remove/insert the cartridge assembly 58 at the underside of the housing 50 as indicated by arrow 59. The housing 50 can be machined, die-cast, or otherwise formed from a single stock of material. The top portion of the pump housing 50 includes an opening for receiving the drive axle of the motor 42. A syringe 22 in a holder 20 and feed tube 40 are releasably coupled to a side wall of the housing 50, as shown. In some embodiments, the feed tube 40 is formed of a flexible material such as plastic or rubber, and has a first end of which elastically deforms to fit over the end of an outlet or other interface of the syringe 22 to form a tight seal with the syringe 22. The second end of the feed tube 40 inserts into an inlet 246, or feed aperture, formed in the cartridge assembly 58 (see FIG. 2B). In other embodiments, the feed tube 40 can be formed of a rigid material such as stainless steel, aluminum, and the like and couple via a threaded adapter or the like between the syringe 22 and the cartridge assembly 58.

As shown in FIGS. 2A-2D, the cartridge assembly 58 has a first end 102 for receiving a feed screw assembly 70 and a second end 103 for receiving the dispense tip 275. A fluid path is formed from the cartridge inlet 246, or feed aperture, preferably through a sidewall of the cartridge assembly 58 receiving a distal end of the feed tube 40 extends through the cartridge body to a chamber 249 in the cartridge body, which can include a chamber volume, in which a feed screw 75 of the feed screw assembly 70 is positioned, then to an outlet 276 of the cartridge assembly 58. In some embodiments, the chamber 249 includes an elongated pocket or the like formed within the inlet port between the feed screw and the inner wall of the cartridge body, in a region proximal to the inlet port. Cartridge feed aperture 246 receives a source of material from the feed tube 40, and in turn outputs the source of the material to the cartridge chamber 249 housing the feed screw 75 during a dispensing operation. The dispense tip 275 at an outlet of the cartridge assembly 58 extends the fluid path from the cartridge assembly 58 to the dispense tip 275. The source of material received by the cartridge assembly 58 is output from the dispense tip 275.

Figure 2C:
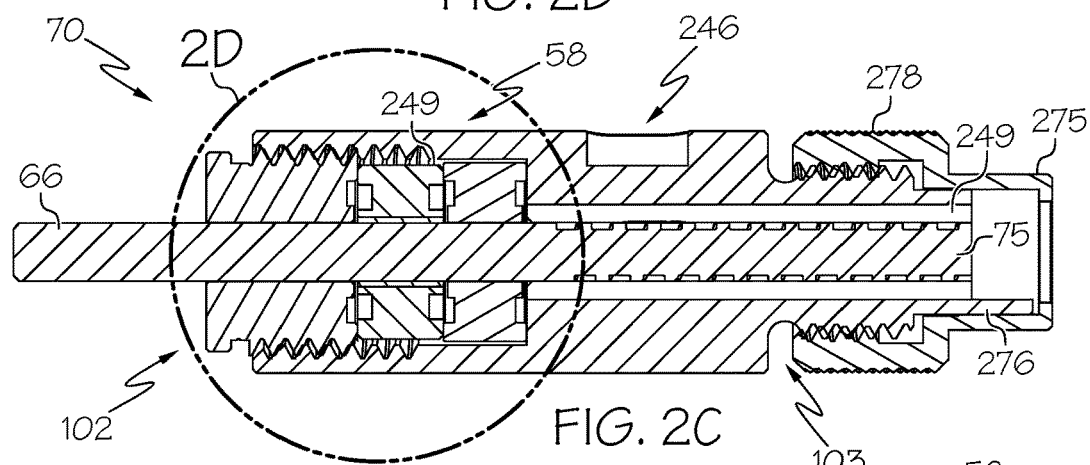
FIG. 2C is a cross-sectional view of the cartridge assembly and feed screw assembly of FIG. 2B.
Figure 2D:
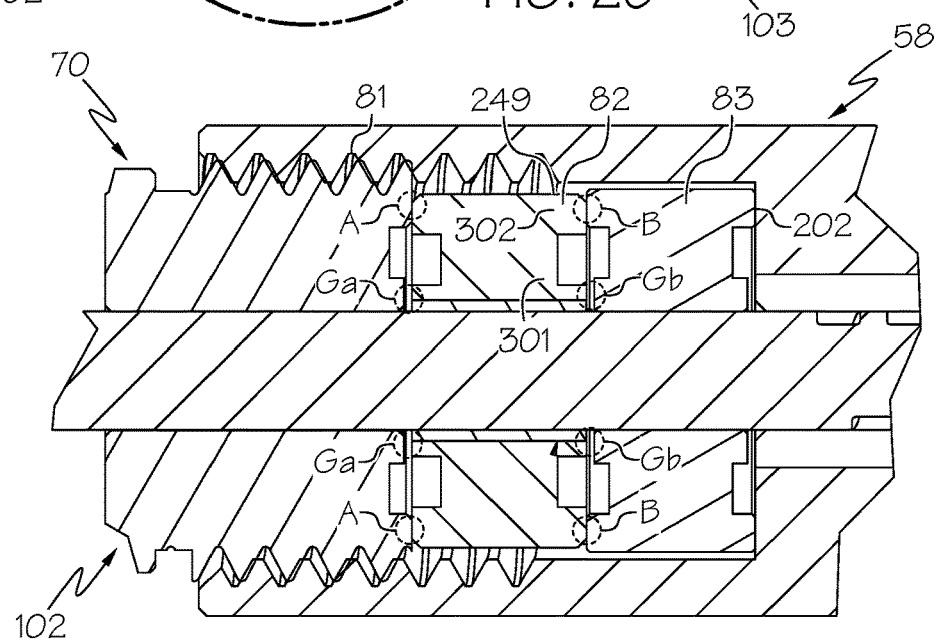
FIG. 2D is an enlarged view of a region of the cartridge assembly and feed screw assembly of FIGS. 1-2C.

In some embodiments, as shown in FIGS. 2C and 2D, a top region of the chamber 249 of the cartridge assembly 58 is threaded for receiving a spanner nut 81. Details of the spanner nut 81 are described with respect to FIGS. 6A-6E.

In addition to the feed screw 75 and spanner nut 81, the feed screw assembly 70 in some embodiments includes a bearing assembly 82 positioned about a shaft 67 of the feed screw 75. The indexed portion 66 may be at a distal end of the shaft 67.

A center of the spanner nut 81 can include a hole 84 (see FIG. 6A) through which the indexed shaft 66 of the feed screw 75 extends for coupling to a motor 42. In some embodiments, the hole 84 has a width, circumference, and/or related dimension for positioning about the feed screw 75. In some embodiments, ring-shaped seals, o-rings, or other fluid-prevention mechanical components are positioned in grooves, counterbores, or the like (not shown) of the cartridge body 58 to prevent fluid from escaping the cartridge chamber 249. The spanner nut 81 is preferably threaded, and constructed and arranged to apply pressure to the bearing assembly 82 in a direction along a longitudinal axis of the neck including the indexed shaft 66 and feed screw 75.

In some embodiments, the spanner nut 81 is constructed and arranged to operate as a spring-loaded spanner nut, or otherwise formed of materials providing the spanner nut 81 with an inherent amount of elasticity, compressibility, or the like as compared to stainless steel or other hard materials, which reduces the amount of axial play along the longitudinal axis of the feed screw 75 during a fluid dispensing operation as compared to a configuration that includes an finite amount of axial clearance between the spanner nut 81 and the neighboring bearing 82, which can affect the accuracy of an output of fluid from the dispense pump. The presence of a spring-loaded spanner nut 81 allows a force to be applied by the spanner nut 81 directly abutting the bearing 82 to reduce axial play without impeding rotation of the feed screw 75.

In some embodiments, the feed screw assembly 70 also includes a washer element 83. In some embodiments, the bearing assembly 82 is sandwiched between the spanner nut 81 and the washer element 83. The washer element 83 is positioned against an interior surface of the cartridge assembly 58, in particular, a cavity, groove, or related seat 202 inside the cartridge assembly 58 (see for example FIGS. 2D and 4E). In some embodiments (not shown), the washer element 83 is absent. Instead, the bearing assembly 82 is positioned in the cartridge assembly 58, for example, seated in a cavity, groove, recess, or related seat 202 for directly abutting the seat 202 inside the chamber volume of the cartridge assembly 58, and sandwiched between the cartridge seat 202 and the threaded spanner nut 81. Here, a region of the cartridge chamber 249 is configured and shaped to specifically accommodate the threaded spanner nut 81 and the bearing assembly 82. Some or all of the bearing assembly 82 can be formed of metal such stainless steel, or ceramic, or other material providing sufficient rigidity so that the bearing assembly 82 can operate with sufficient accuracy and continuous precision for performing a dispensing operation by a dispense pump including the feed screw assembly 70. The bearing assembly 82 may include other elements not shown, such as shields for protecting the interior of the bearing assembly 82 from dirt or other contaminants.

Figure 3A:
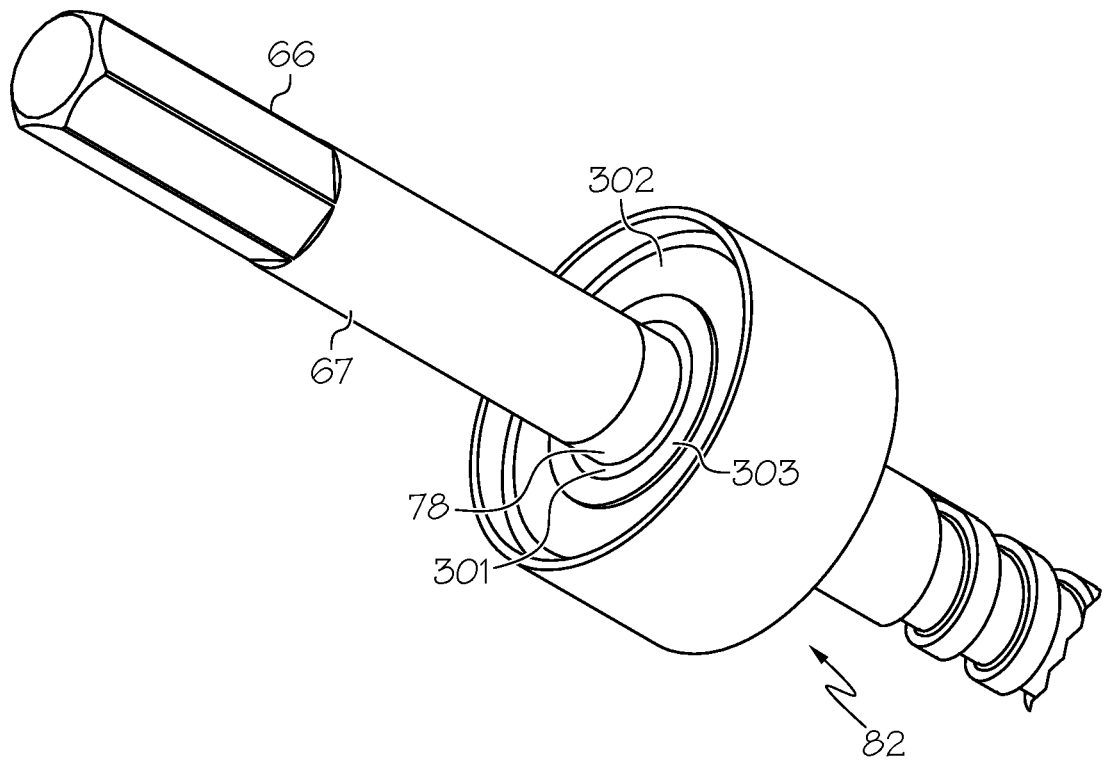
FIG. 3A is a perspective view of a bearing assembly of the feed screw assembly of FIG. 2, in accordance with some embodiments.
Figure 3B:
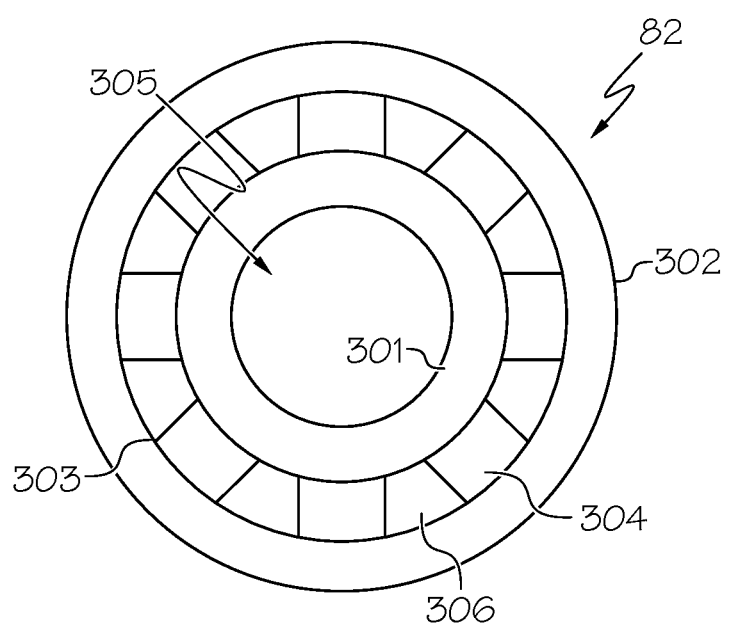
FIG. 3B is a front view of the bearing assembly of FIG. 3A.

As shown in FIGS. 3A and 3B, the bearing assembly 82 includes an inner race or ring 301, an outer race or ring 302, a track, raceway, retainer, or cage 303 between and concentric with the inner race 301 and outer race 302, and a set of ball bearings 304, or cylindrical rollers or the like positioned in the cage 303, raceway, or related separator and between the inner race 301 and outer race 302. As shown in FIG. 3B, in some bearing embodiments a set of spacers 306 can be positioned between the ball bearings 304 so that neighboring ball bearings 304 do not amass or otherwise bunch to or otherwise directly abut each other in an undesirable manner. A bore 305 extends through the inner race 301 for receiving the axle or shaft 67 of the feed screw assembly 70.

The bearing assembly 82 is constructed and arranged so that that inner race 301 rotates inside the outer race 302, which is fixed in an axial direction relative to the cartridge assembly 58. Some force may be applied to widen the bore 305 radially so that inner race 301 in turn applies a force against the ball bearings 304 in a radial direction. The feed screw shaft 67 is bonded, press-fit or otherwise coupled to the bore 305 of the inner race 301 so that the feed screw shaft 67 rotates freely with the inner race 301 due to the separation of the inner race 301, or ring, from the outer race 302, or ring, by the cage 303 or other separator component. In some embodiments, the bore 305 has a diameter, circumference, or related dimension that is slightly less than that of the feed screw shaft 67 so that the shaft 67 is press-fit with respect to the inner race 301.

Referring again to FIG. 2D, in some embodiments, one end of the outer race 302 of the bearing assembly 82 directly abuts the spanner nut 81 at regions (A) and the other end directly abuts the washer element 83 at regions (B). In some embodiments, the bearing assembly 82 and spanner nut 81 are each formed of a same or different metal so that metal-on-metal contact occurs at regions (A). In other embodiments, the spanner nut 81 is formed of a non-metal material that provides a spring-like characteristic, which directly contacts the metal bearing assembly 82. Here, the outer race 302 of the bearing assembly 82 is positioned between and directly abuts both the spanner nut 81 and washer element 83. However, in FIG. 2D, in a longitudinal direction of the feed screw, a first gap (Ga) is present between one end of the inner race 301 and the spanner nut 81 and a second gap (Gb) is present between the other end of the inner race 301 and the washer element 83, which permits the inner race 301 to rotate in an uninterrupted manner with the feed screw 75 or other speeds capable of being performed by the motor 42. The gaps (Ga, Gb (generally, G)) can extend in a direction perpendicular to the longitudinal direction from regions (A, B), respectively, to the shaft 66 in the bore 305 or a cylindrical sleeve 78 between the feed screw 75 and the shaft 67 (see FIG. 4A). As described herein, some embodiments include gaps (G), or clearances, being formed by the various configurations of the spanner nut 81 and washer element 83, respectively, each abutting a side of the bearing assembly 82.

The bearing assembly 82 provides for significantly less radial and axial play than a conventional solid ring shaft collar. In particular, the bearing assembly 82 includes a ball-to-raceway conformity by way of the cage 303 as well as a rotational relationship between the inner race 301 and outer race 302 that impacts the ability of a ball bearings 304 in the cage 303 to support loads under a variety of conditions.

During operation, in particular, when the feed screw 75 rotates, the bearing assembly 82 is subjected to thrust loading or ball-to-raceway contact stress. However, the load is distributed over the number of balls 304 arranged in the cage 303. The radial forces applied from the inner race 301 in a direction of the cage 303 containing the balls 304 permits sufficient clearance between the inner 301 and outer 302 races while providing a relative axial movement of the inner ring 301 with respect to the outer ring 302 to provide minimal axial play along the longitudinal axis of the feed screw 75 during a fluid dispensing operation that includes a rotation of the feed screw 75 about the longitudinal axis.

As described above, the spanner nut 81 can be formed of a non-metal material having elasticity or compression characteristics that permits the spanner nut 81 to operate as a spring-loaded spanner nut. In some embodiments, a spring can be machined, molded, or otherwise integrally formed into a stock, which in turn forms at least a portion of the spanner nut 81. Here, the elasticity or related features are integral to the spanner nut 81. As shown in FIGS. 10A-12E, other embodiments may include a spring that is formed separately from a spanner nut. Mechanical components other than a spring may equally apply so long as these components provide the desired elasticity or compression characteristics for precise fluid output patterns of periodic consistent volume dimensions to be output during rotation of the feed screw. Details of these various embodiments are described in greater detail below.

FIGS. 4A-4D are illustrations of method steps of forming a feed screw assembly 70, in accordance with some embodiments.

Figure 4A:
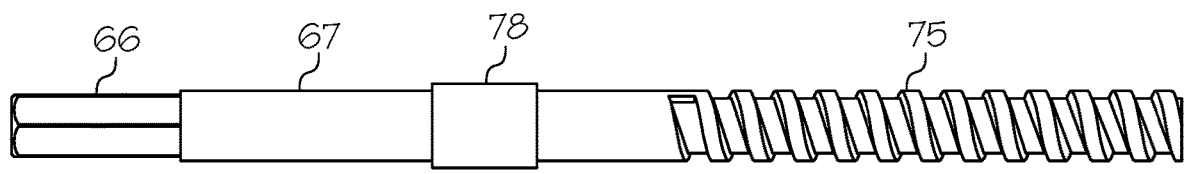
FIGS. 4A-4E are illustrations of method steps of forming a feed screw assembly, in accordance with some embodiments.

In some embodiments, the inner diameter of the inner race 301 of the bearing assembly 82 may be too large as compared to the diameter of the feed screw shaft 67 in order for the shaft 67 to be press-fit, bonded, or otherwise tightly positioned in the bore 305 of the inner race 301. To address this, as shown in FIG. 4A, a cylindrical sleeve 78 is press-fit about a region of a feed screw shaft 67 between the helical threads of the feed screw 75 and an indexed portion 66 of the shaft 67. The sleeve 78 may be formed of materials that permits the sleeve to be ground or otherwise machined after press-fitting to the shaft. In some embodiments, the sleeve 78 is ground or otherwise machined after the press-fit to be concentric with a longitudinal center axis of the feed screw shaft 67 and to receive the bearing assembly 82. The sleeve 78 is also constructed and arranged for positioning about a region of the feed screw shaft 67 during assembly that maintains a predetermined distance from a distal end of the feed screw 75 so that the feed screw assembly 70 can be inserted with accuracy in the cartridge assembly 58. The inner diameter of the bearing assembly 82 is preferably sufficient to be press-fit to the sleeve 78. The sleeve 78 may have a larger diameter to simplify the coupling of the sleeve 78 to the shaft 67. Here, the inner diameter of the bore 305 of the bearing assembly 82 must be of a diameter to accommodate the larger diameter of the sleeve 78.

Figure 4B:
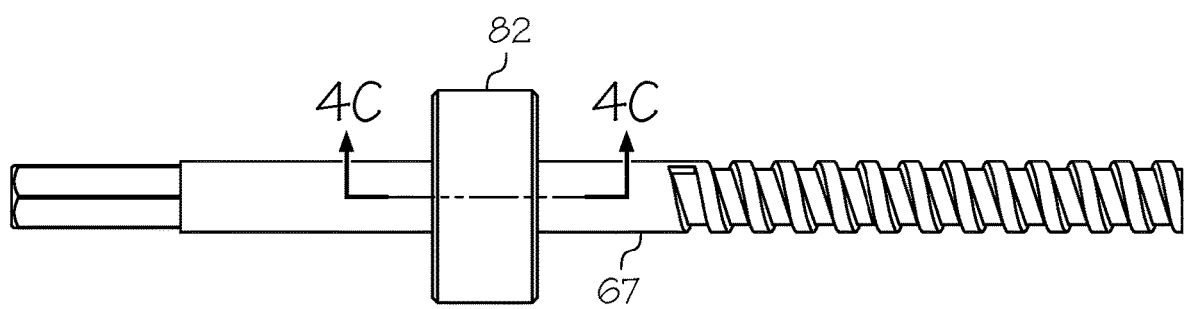
Figure 4C:
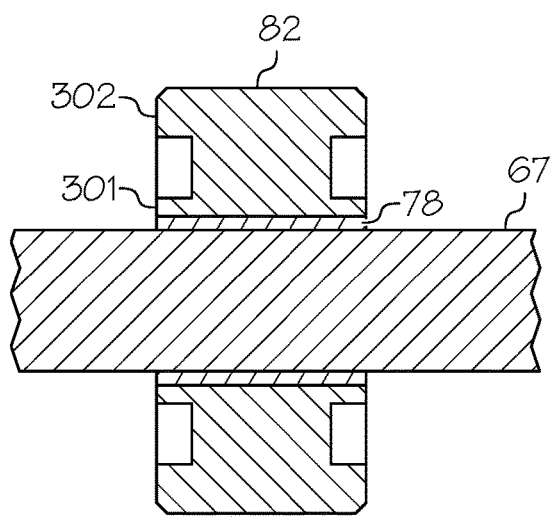
Figure 4D:
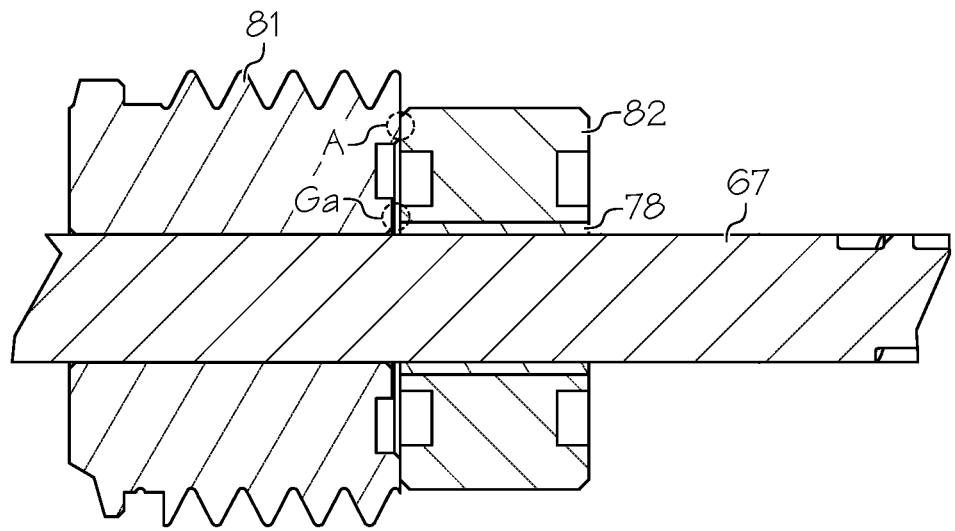
Figure 4E:
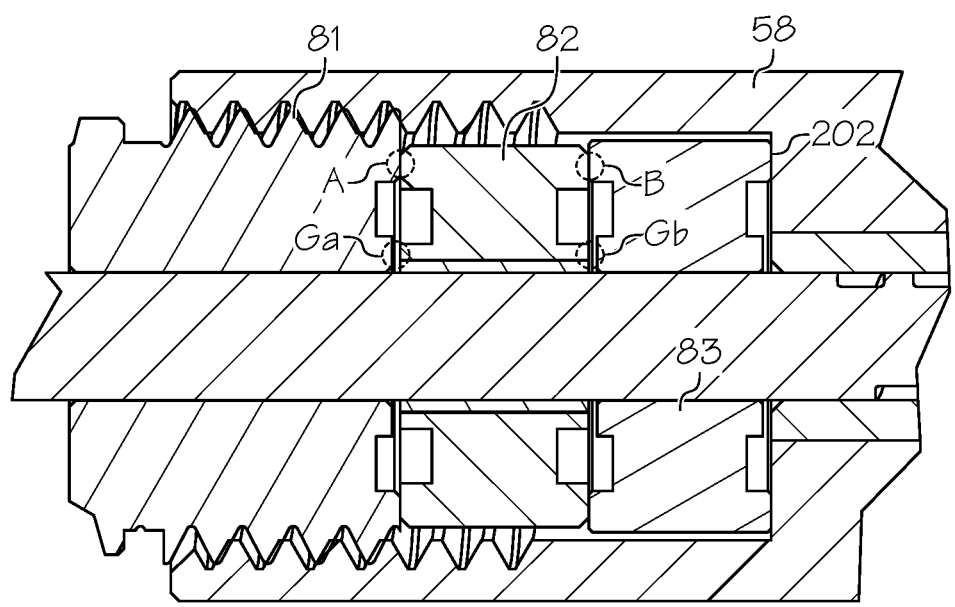
Figure 5A:
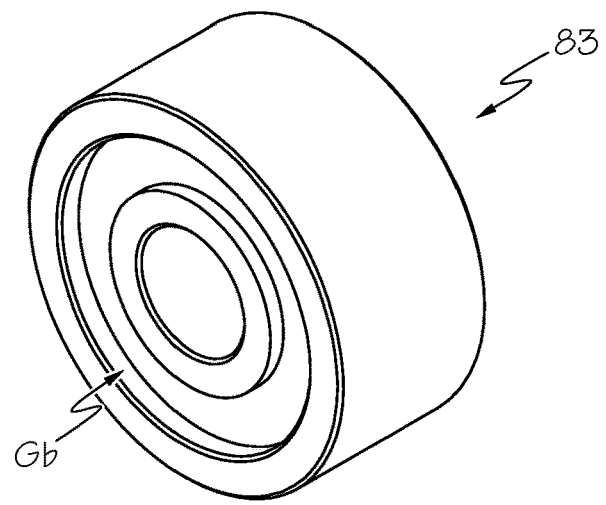
FIG. 5A is a perspective view of a feed screw assembly washer, in accordance with some embodiments.
Figure 5B:
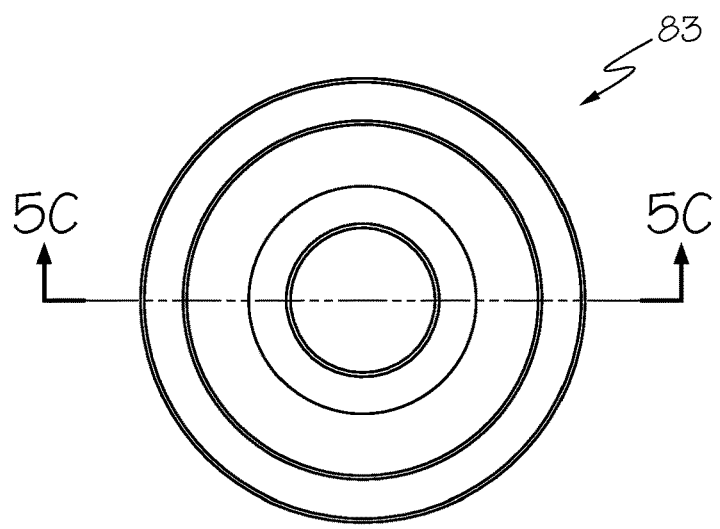
FIG. 5B is a top view of the feed screw assembly washer of FIG. 5A.
Figure 5C:
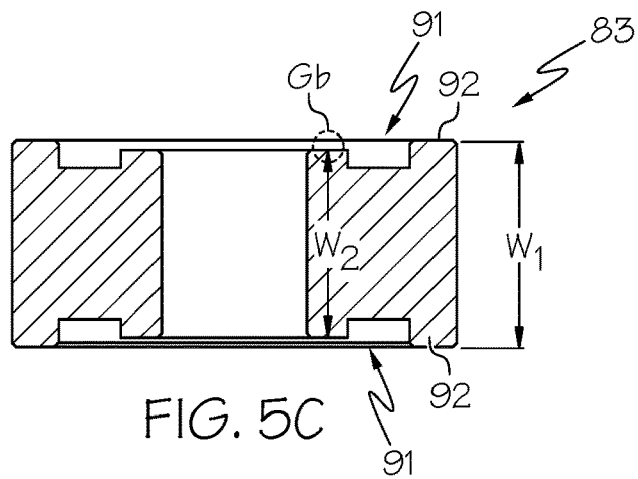
FIG. 5C is a cross-sectional view of the feed screw assembly washer of FIGS. 5A and 5B.
Figure 6A:
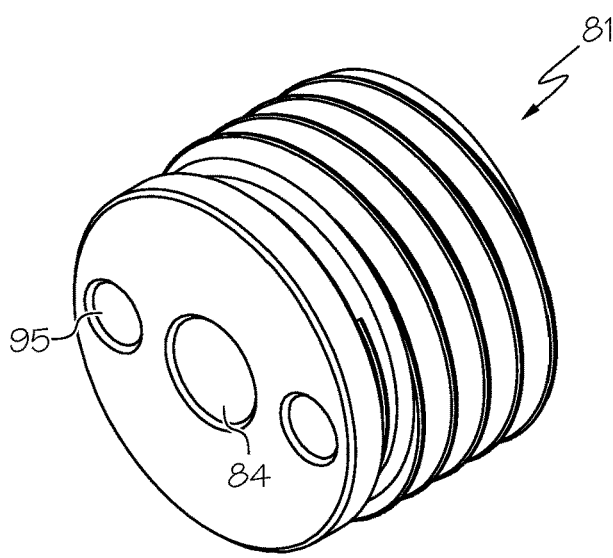
FIG. 6A is a perspective view of a feed screw assembly spanner nut, in accordance with some embodiments.
Figure 6B:
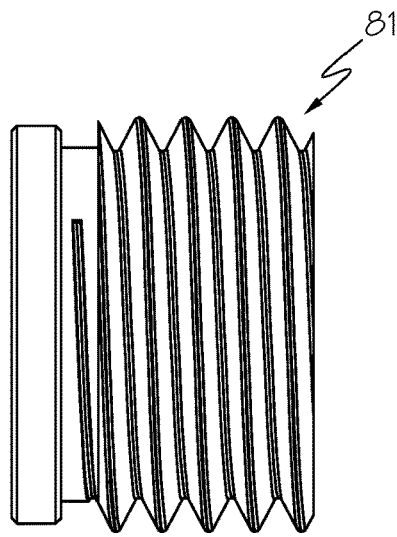
FIG. 6B is a side view of the feed screw assembly spanner nut of FIG. 6A.
Figure 6C:
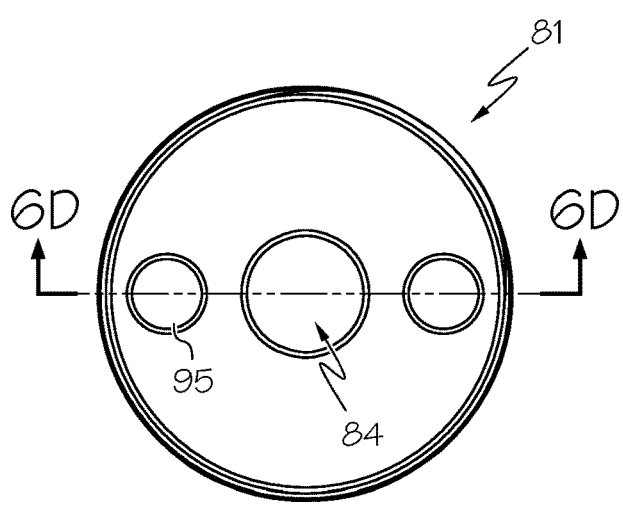
FIG. 6C is a top view of the feed screw assembly spanner nut of FIGS. 6A and 6B.
Figure 6D:
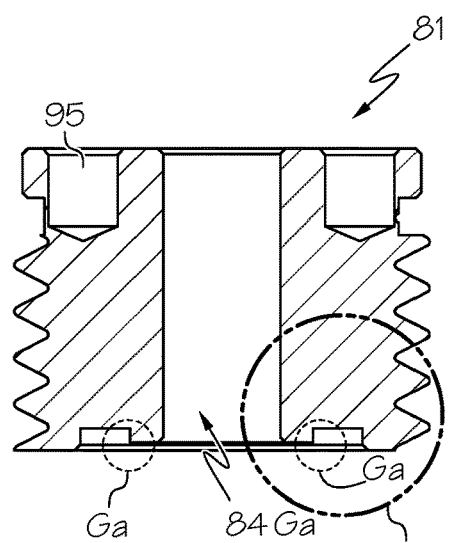
FIG. 6D is a cross-sectional view of the feed screw assembly spanner nut of FIGS. 6A-6C.
Figure 6E:
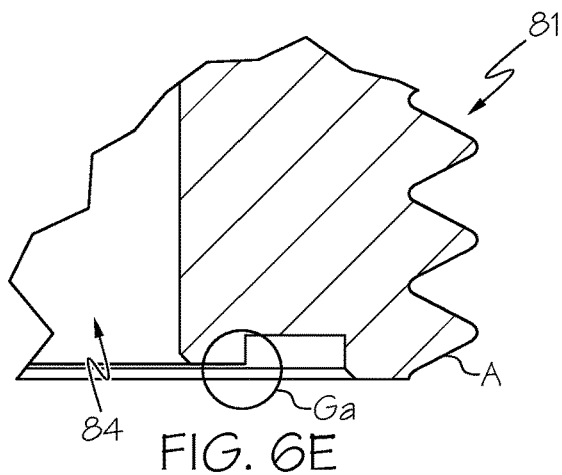
FIG. 6E is an enlarged view of the cross-sectional view of the feed screw assembly spanner nut of FIGS. 6A-6D.

In some embodiments, the cartridge assembly 58 includes a seat region. The inner race is press-fit or otherwise applied directly or bonded to the seat. As shown in FIGS. 4B and 4C, the bearing assembly 82 is positioned about the sleeve 78, which in turn is about the auger shaft 67. The bearing assembly 82 may be press-fit or otherwise tightly positioned about the sleeve 78. As described above, the inner race ring 301 is constructed and arranged to rotate inside an inner diameter of the outer race ring 302 due at least in part to a clearance between the inner race 301 and outer race 302. Accordingly, the press-fit configuration between the inner race 301 and the feed screw shaft 67 permits the feed screw 75 to rotate with the inner race 301 in a manner that reduces undesirable radial and axial play along the longitudinal axis of the feed screw 75 during a fluid dispensing operation. In addition, the inner race 301, outer race 302, sleeve 78, and feed screw 75 are arranged to be concentric so as each be about the longitudinal axis of the feed screw 75.

As previously described, the ball bearings 304 of the bearing assembly 82 are constructed and arranged to conform to the raceway 303 between the inner race 301 and outer race 302 to support an axial load across the bearing assembly 82 while allowing a maximum and frictionless axial movement of the inner race 301 with respect to the outer race 302. The axial end play, or gap (G) or clearance, is directly related to the radial play of the ball bearings 304. Any undesirable internal looseness can be removed by applying the axial preload, for example, by the shaft 67 and sleeve 78 providing a radial force from the inner diameter of the inner race 301 in a direction of the outer race 302. In some embodiments, the width of the gap (G) can be modified by applying shims, washers, or the like as part of the assembly process. In some embodiments a washer element 83 sandwiches the bearing assembly 82 between the spanner nut 81 and washer element 83. As shown in FIGS. 4E and 5A-5C, the washer element 83 can include a gap (Gb) that aligns with the inner race 301 of the bearing assembly 82 so that the gap (Gb) provides for a clearance between the inner race 301 and the washer element 83 whereby the inner race 301 can rotate in an uninterrupted manner at high RPMs between the spanner nut 81 and washer element 83. Accordingly, a thickness (w1) or related dimension of the washer element 83 at a surface 92 constructed and arranged for directly abutting the outer race 302 of the bearing assembly 82 is greater than a thickness (w2) or related dimension of the washer element 83 aligned with the inner race 302 such that the gap (Gb) is present between the inner race 302 and the washer element 83. In addition to the gap (Gb), the washer element 83 may include one or more holes 91 or additional gaps or the like for providing further a further clearance or region of separation, or be part of the gap (Gb), between the washer element 83 and the inner race 301 of the bearing assembly 82. The threaded spanner nut 81, when threaded in the cartridge assembly 58 along with the washer element 83 applies a force against the outer race 302 at region B so that the outer race 302 is stationary in the cartridge assembly 58 while the inner race 301 rotates freely inside the cartridge assembly 58.

FIGS. 6A-6E are various views of a feed screw assembly spanner nut 81 for coupling to a cartridge assembly 58 of a dispense pump, in accordance with some embodiments. Some details of the spanner nut 81 are described in FIGS. 1-5 and are not repeated for brevity.

In some embodiments, the spanner nut 81 is formed of plastic or other polymer material. In other embodiments, the spanner nut 81 is formed of one or more materials having rigidity properties that are greater than plastic or related polymer material, such as stainless steel. A stainless steel or high rigidity spanner nut 81 is beneficial for directly abutting the outer race 302 of the bearing assembly 82 during operation to provide an additional reduction in axial play of the feed screw 75 during an operation that includes a rotation of the feed screw 75.

As described above, the spanner nut 81 also includes a gap (Ga) that aligns with the inner race 301 of the bearing assembly 82 so that a clearance is present between the inner race 301 and the spanner nut 81 so that the inner race 301 to rotate in an uninterrupted manner at high RPMs relative to the spanner nut 81, which along with the outer race 302 is stationary. Accordingly a width of the spanner nut 81 at a region (A) constructed and arranged for directly abutting the outer race 302 of the bearing assembly 82 is greater than a width of the spanner nut 81 aligned with the inner race 302 such that a gap (Ga) is present between the inner race 302 and the spanner nut 81. In addition to the gap (Ga), the spanner nut 81 may include one or more holes or the like for providing further a further clearance or region of separation between the spanner nut 81 and the inner race 301 of the bearing assembly 82.

In some embodiments, the spanner nut 81 can include additional holes 95 for receiving a tool, which can aid in the assembly of the feed screw assembly 70 with respect to threading the spanner nut 81 in the threaded interior region of the cartridge assembly 58 with a predetermined compression between the spanner nut 81 and the bearing assembly 82 at abutting regions (A).

Figure 7A:
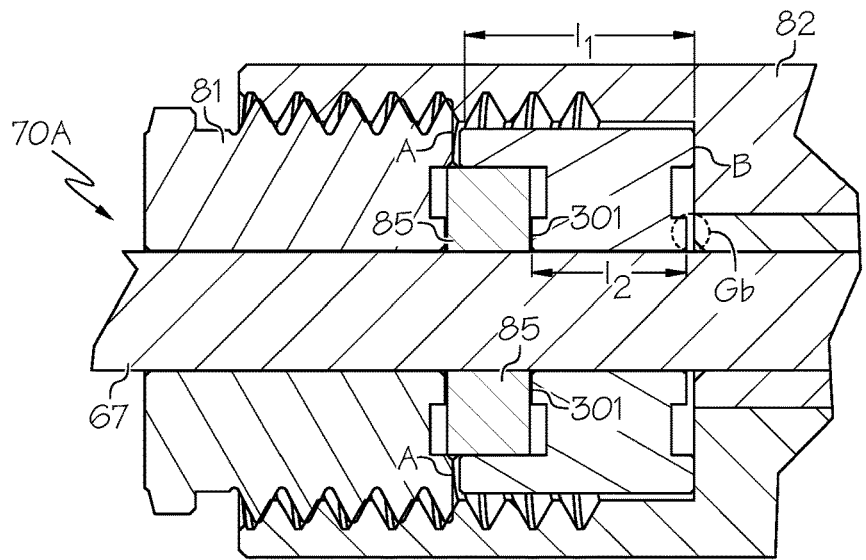
FIG. 7A is a cross-sectional view of a cartridge assembly and feed screw assembly of a fluid dispense pump system, in accordance with other embodiments.
Figure 7B:
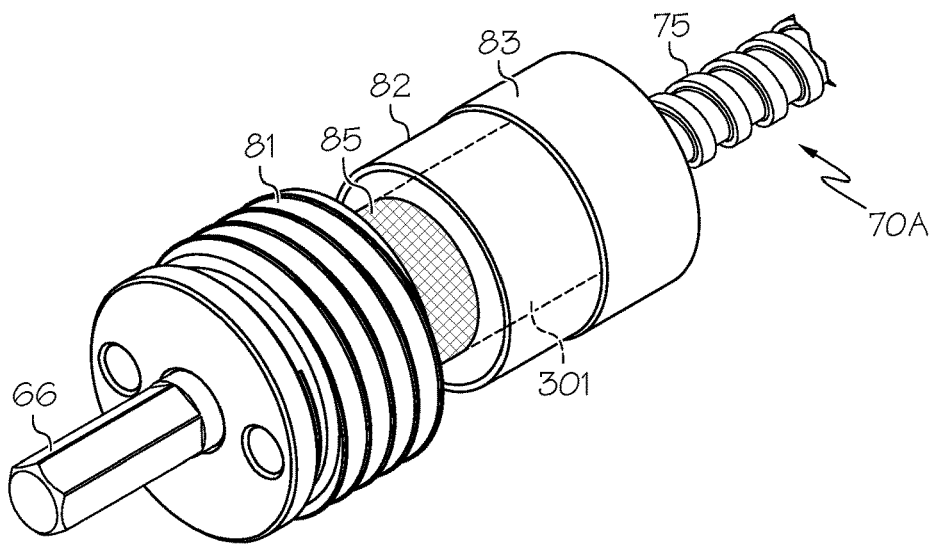
FIG. 7B is a perspective view of the cartridge assembly and feed screw assembly of FIG. 7A.
Figure 7C:
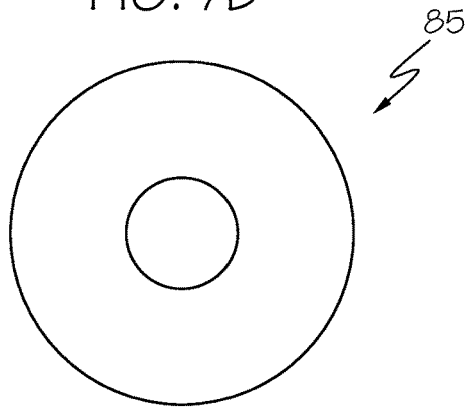
FIG. 7C is a perspective view of a spanner nut load washer of the cartridge assembly and feed screw assembly of FIGS. 7A and 7B, in accordance with some embodiments.

FIG. 7A is a cross-sectional view of a cartridge and feed screw assembly 70A of a fluid dispense pump system, in accordance with other embodiments. FIG. 7B is a perspective view of the cartridge and feed screw assembly 70A of FIG. 7A. FIG. 7C is a perspective view of a spanner nut load washer 85 of the cartridge and feed screw assembly 70A of FIGS. 7A and 7B, in accordance with some embodiments.

As shown in FIGS. 7A and 7B, the spanner nut load washer 85 is positioned between the spanner nut 81 and the bearing assembly 82 to provide an additional reduction in axial play between the bearing assembly 82, the spanner nut 81, and/or other components of the feed screw assembly along the length of the feed screw 75. The load washer 85 can be formed of materials that are less hard than and have compression characteristics as compared to the metal or other hard material forming the spanner nut 81 such as an acetal-based material, for example, Tercite® or related polymer or thermoplastic material, but not limited thereto. The load washer 85 is preferably configured to have a planar, substantially circular shaped washer body, and includes a center opening that is sized so that the feed screw shaft 67 can extend through the washer body as well as through holes in each of the spanner nut 81, bearing assembly 82 and optional washer element 83 aligned with each other in a longitudinal direction to receive the feed screw 75. A length (l1) of the spanner nut 81 between outermost end regions (A, B) where region (A) directly abuts the outer race 302 is greater than a length (l2) of the spanner nut 81 aligned with the inner race 302. This configuration permits a gap to be present between the inner race 301 and the spanner nut 81. The load washer 85 includes an outer circumferential surface configured to be positioned in this gap between the inner race 301 and the spanner nut 81. The load washer 85 requires a planar or substantially flat surface so that one side of the outermost circumferential surface directly abuts the inner race 301 of the bearing assembly 82 and the other side directly abuts the and to minimize or eliminate any axial play between the bearing assembly 82 and the spanner nut 81 each extending along the longitudinal axis of the feed screw 75. Referring again to FIG. 2D, some embodiments may include the load washer 85 positioned at gap Ga otherwise between the inner race 301 of the bearing assembly 82 and the spanner nut 81. Here, some gap may nevertheless be present between the load washer 85 and the inner race 301, or a minimal or negligible abutting force where there is little or no gap here so that the feed screw 75 can rotate freely with assistance from the inner race 301. In some embodiments, the load washer 85 may have a thickness that prevents the outermost end of the bearing assembly 82 at region (A) from directly abutting a surface of the spanner nut 81. However, the biasing or spring-like characteristics of the load washer 85 during a dispensing operation may cause the load washer 85 to compress due to axial forces so that at times during the dispensing operation the bearing assembly 82 at region (A) may contact the spanner nut 81. Although the load washer 85 may abut the inner race 301 of the bearing assembly 82, the force applied by the load washer 85 is negligible so as to not impede rotation of the feed screw 75 during a dispensing operation.

Figure 8:
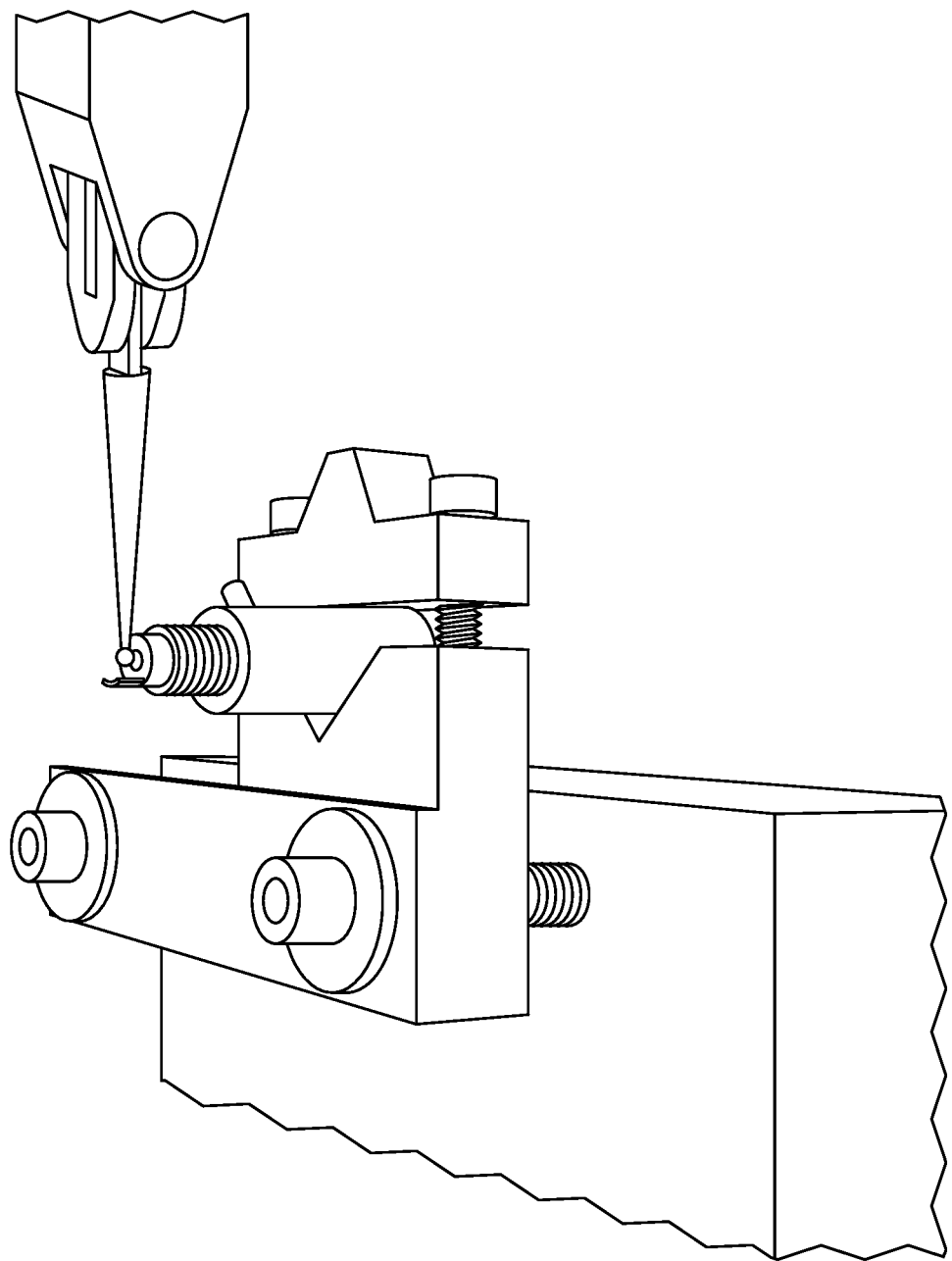
FIG. 8 is a view of a measurement result of a precision micrometer gauge illustrating a flat minimal axial play of a feed screw assembly, in accordance with some embodiments.

FIG. 8 illustrates a micrometer or related measurement apparatus measuring axial movement of the bearing assembly inserted in a feed screw 75. For example, an operator may move the feed screw 75 up and down whereby the apparatus measures the up and down play along the z axis. The presence of a load washer 85 in this example is shown to reduce axial movement by 0.00004 inches (0.001016 mm) or less.

As described herein, a bearing assembly of a feed screw assembly permits the feed screw to rotate in a desirable manner so that fluid material is dispensed from the outlet of the feed screw assembly at precise, consistent, and predetermined micro-volume dimensions. In doing so, the bearing assembly interacts with a threaded spanner nut and optionally one or more washers to reduce or eliminate the undesirable effect on such micro-volume dimensions caused by radial and/or axial play between the bearing assembly and the spanner nut.

Figure 9A:
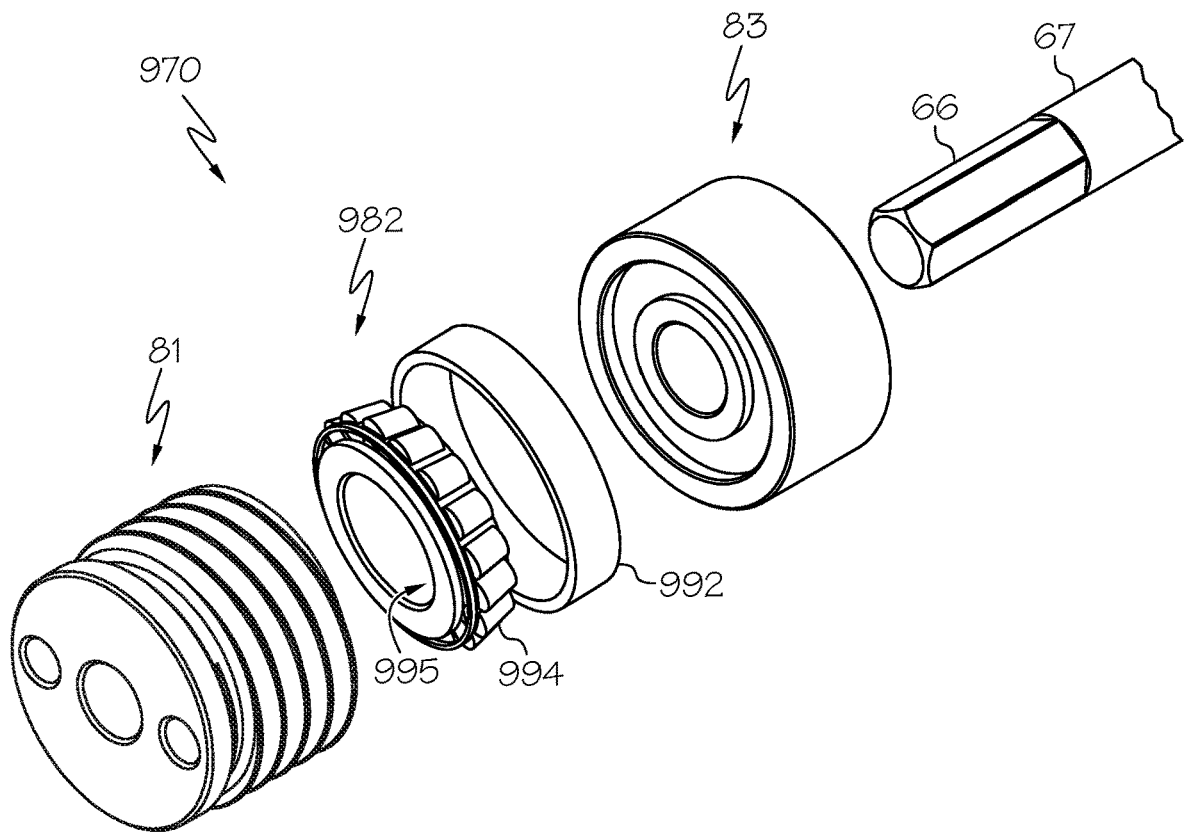
FIG. 9A is an exploded view of a feed screw assembly, in accordance with some embodiments.
Figure 9B:
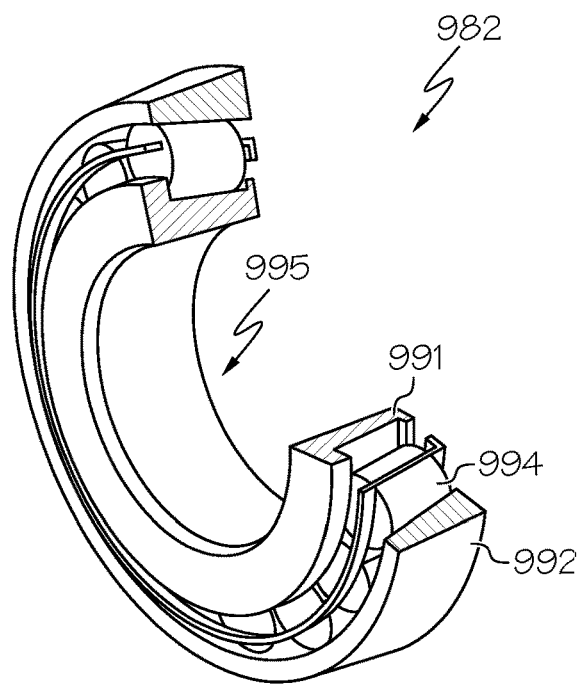
FIG. 9B is a cutaway view of a tapered roller bearing of the feed screw assembly of FIG. 9A.

Although various embodiments describe improvements to the spanner nut to achieve the foregoing, other embodiments include various rotary bearing configurations may contribute to such improvements in accurate dispensing of fluid from micro-volume dispense pumps or the like. For example, FIGS. 9A and 9B illustrate a feed screw assembly 970 having a thrust bearing, or a tapered roller thrust bearing 982, which can absorb or otherwise accommodate the radial and axial forces generated during a fluid dispensing operation.

A plurality of cylindrical or conical rollers 994 between inner ring 991 and outer ring 992, each having a tapered or pitched raceway that accommodates the conical surfaces so that the rollers 994 are tapered in a direction of the longitudinal axis of the feed screw 75 positioned in the bore 995 of the inner ring 991. In some embodiments, the inner ring 991 includes a set of ribs or a cage assembly with the rollers 994 that is removable from the outer ring 992. The rollers 994 are guided by contact between the large end of the roller and a rib on the inner ring 991 facing the spanner nut while the smaller or tapered end of the roller faces the distal end of the feed screw assembly 970. An important feature is that the inner ring 991, outer ring 992, and feed screw 75 remain coaxial during rotation of the feed screw 75 and inner ring 991, which is suitable for greater load conditions than with ball bearings. Sufficient clearance is provided to permit such rotation but also minimizing the clearance in view the desire for minimal axial play.

FIGS. 10A-10E are various views of a cartridge assembly 1058 of a fluid dispense pump system, in accordance with other embodiments. As described above, the spanner nut assembly includes a standalone coil spring 1086 or other elastic mechanical component that provides spring-related forces between a threaded spanner nut 1081 and a ring collar 1092. The ring collar 1092 can be attached to an auger shaft 1066 of a feed screw assembly 1075 by a recessed set screw 1093 or the like that extends through a hole in the collar 1092. A special-purpose wrench or related tool is used to tighten the set screw 1092. When the set screw 1093 is tightened, the collar 1092 can rotate with the auger inside the cartridge assembly 1058. Since the collar 1092 is sandwiched between the threaded spanner nut 1081 and the washer 1083, a gap or clearance may be present between the collar 1092 and spanner nut 1081 to allow uninhibited rotation of the auger screw. This clearance may result in radial and/or axial play, which is mitigated or otherwise compensated for by a combination of the spring 1086, washer 1083, and closed-loop servo motor (not shown). In other embodiments, described herein in FIGS. 12A-12E, a bearing assembly 1282 may be positioned in a cartridge assembly 1258 in lieu of a ring collar.

Additional details on the feed screw 1075, collar 1092, cartridge assembly 1058, and a needle nut 278 coupled to the cartridge assembly 1058 are similar to or the same as those described in other embodiments above, and are not repeated with respect to FIGS. 10A-10E for brevity.

In some embodiments, the coil spring 1086 or other elastic object has a first end positioned in a cavity or counterbore 1091 of the spanner nut 1081 and an axial force corresponding to a compression load with respect to the spring 1086 by the ring collar 1092 and/or load washer 1085 of the feed screw assembly 1075 at a second end of the spring 1186. As previously mentioned, the feed screw assembly 1075 includes an auger shaft 1066. The auger shaft 1066 can be are similar to or the same as those described in other embodiments above. Details of the auger shaft 1066 are therefore not repeated with respect to FIGS. 10A-10E for brevity. Accordingly, a combination of a closed-loop servo motor 42 (see FIG. 1) and spring 1086 provide a sufficient force on the collar 1092 in a direction of a distal end of the cartridge assembly 1058 to permit a precise, consistent flow of fluid material through the cartridge assembly 1058 and corresponding uniform small volumes of the fluid material from the cartridge assembly 1058, notwithstanding the presence of possible radial and/or axial play of components inside the cartridge 1058 shown in FIGS. 10D and 10E.

Figure 10A:
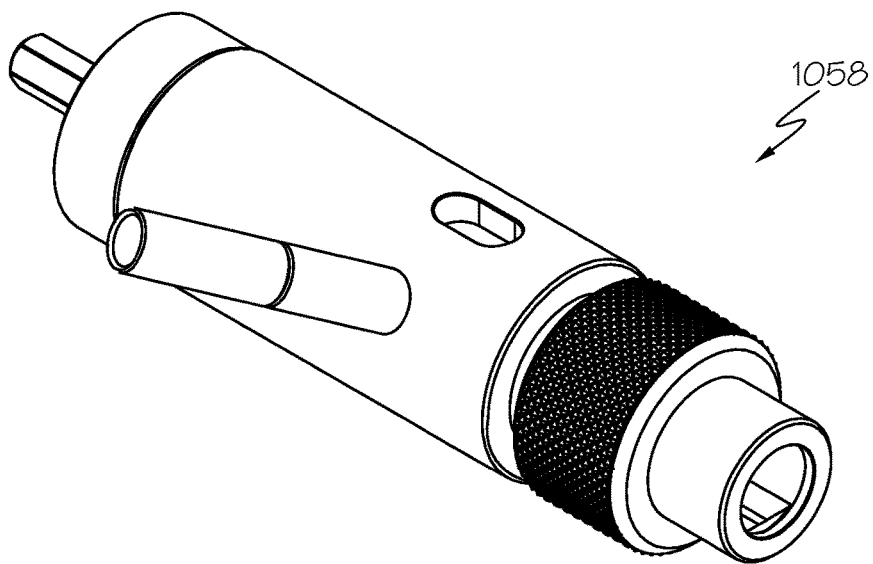
FIG. 10A is a perspective view of a cartridge assembly of a fluid dispense pump system, in accordance with other embodiments.
Figure 10B:
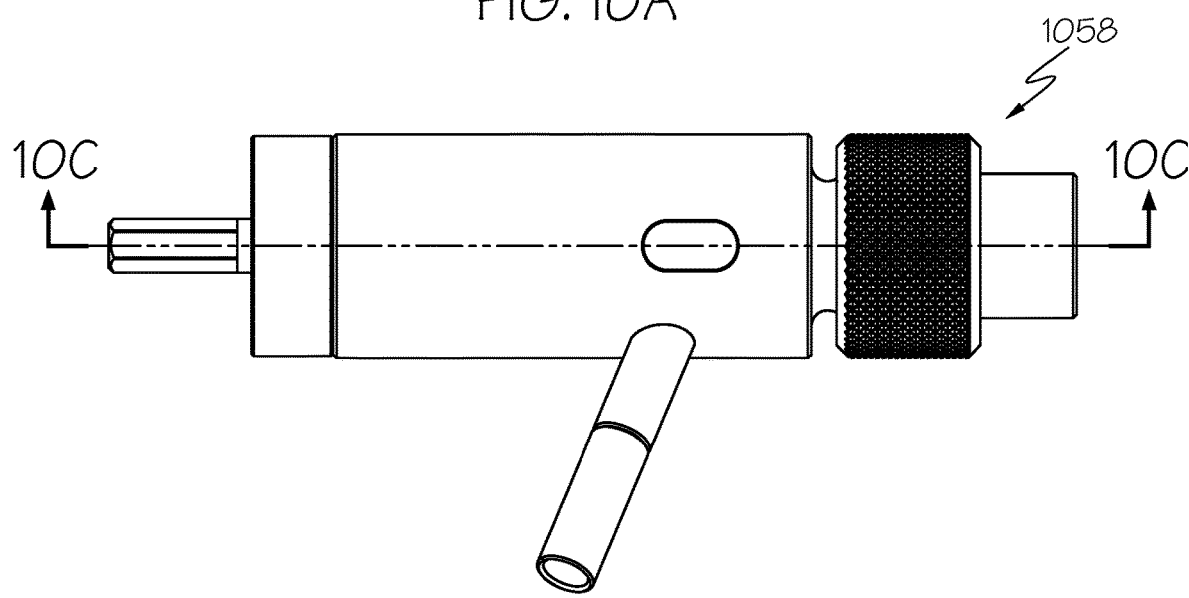
FIG. 10B is a side view of the cartridge assembly of FIG. 10A.
Figure 10C:
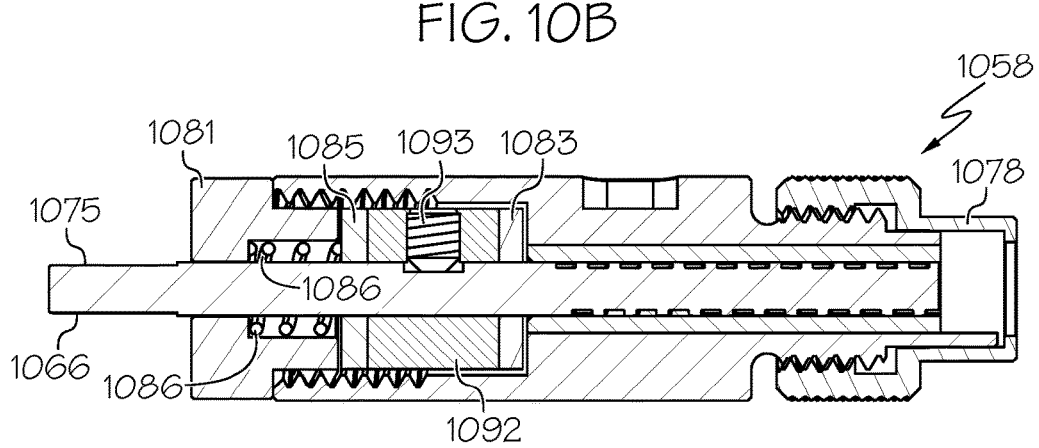
FIG. 10C is a cross-sectional view of the cartridge assembly of FIGS. 10A and 10B.
Figure 10D:
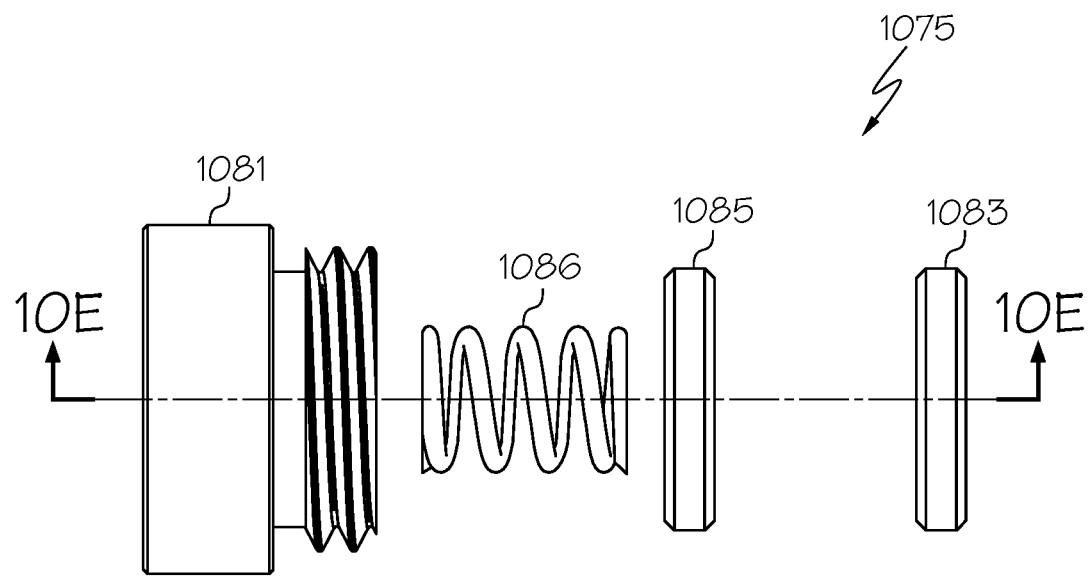
FIG. 10D is a side view of elements of a feed screw assembly of the cartridge assembly of FIGS. 10A-10C.
Figure 10E:
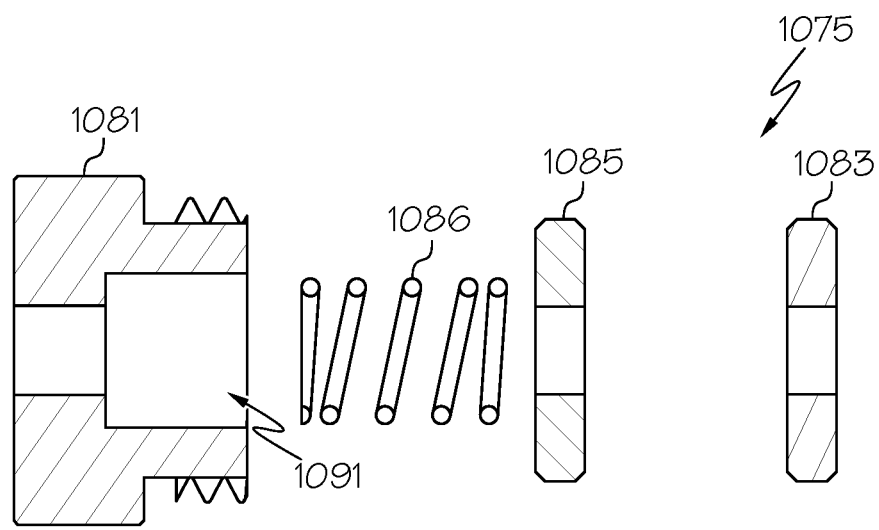
FIG. 10E is a cross-sectional side view of the elements of the feed screw assembly of the cartridge assembly of FIGS. 10A-10D.

In particular, as shown in FIGS. 10D and 10E, the feed screw assembly 1075 can include additional elements, including but not limited to the spanner nut 1081, coil spring 1086, load washer 1085, and a washer element 1083.

In some embodiments, the load washer 1085 is positioned between the spanner nut 1081 and the ring collar 1092. The load washer 1085 can be the same as or similar to the load washer 85 described with reference to FIGS. 7A-7C above so details are not repeated for brevity. The load washer 1085 applies a load to the spring 1086 during operation of the feed screw auger 1066 to provide additional consistency with respect to outputs of the fluid material. In some embodiments, the load washer 1085 is on one end of the ring collar 1092 and the washer element 1083 is on the other side of the ring collar 1092. In some embodiments, the washer element 1083 is similar to washer element 83 above so details are not repeated for brevity. In some embodiments, the load washer 1085 and washer element 1083 have same or similar configurations, for example, formed of a same material, same dimensions, and so on. In addition, the load washer 1085 and washer element 1083 can have a same width, diameter, circumference, or related dimension as the ring collar 1092. In other embodiments, the load washer 1085 and washer element 1083 have different configurations. For example, as shown in FIG. 10F, the load washer 1085A may have a "top hat" shape where a first portion of a first diameter, circumference, or other dimension is sufficient to directly abut the surface of the ring collar 1092. A second cylindrical portion extends from the first portion and is of a smaller diameter, circumference, or other dimension for insertion into the counterbore 1091 of the threaded spanner nut 1081, and while not shown, the second cylindrical portion of the washer 1085 can apply a force on the spring 1086 inside the counterbore 1091.

Figure 11A:
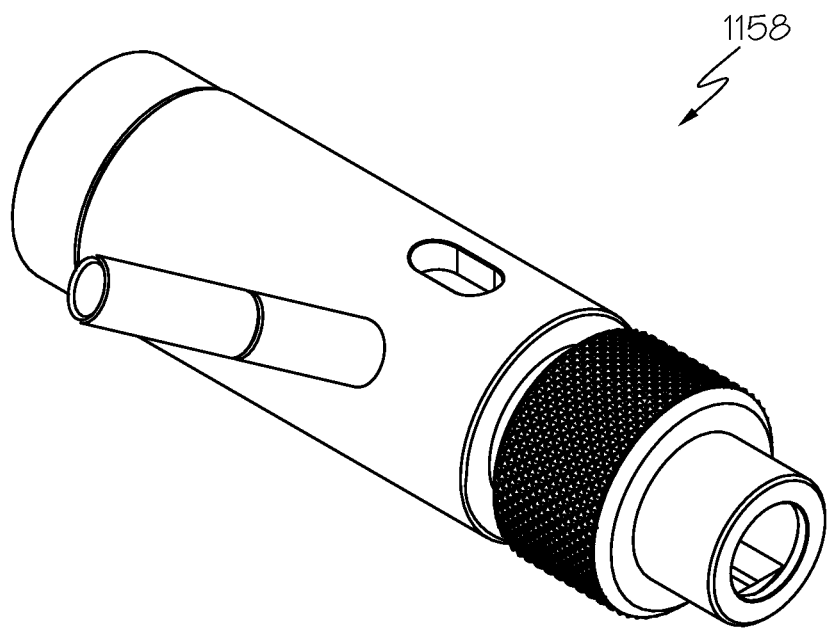
FIG. 11A is a perspective view of a cartridge assembly of a fluid dispense pump system, in accordance with other embodiments.
Figure 11B:
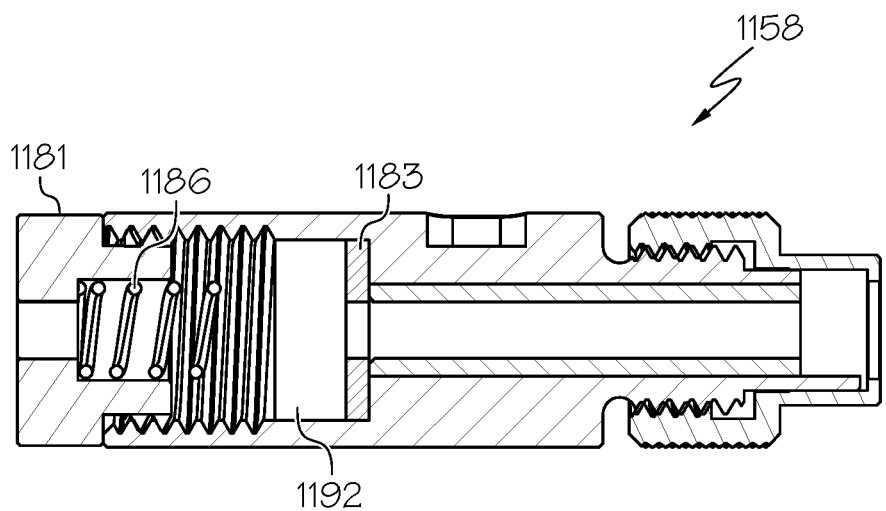
FIG. 11B is a cross-sectional side view of the cartridge assembly of FIG. 11A.
Figure 12A:
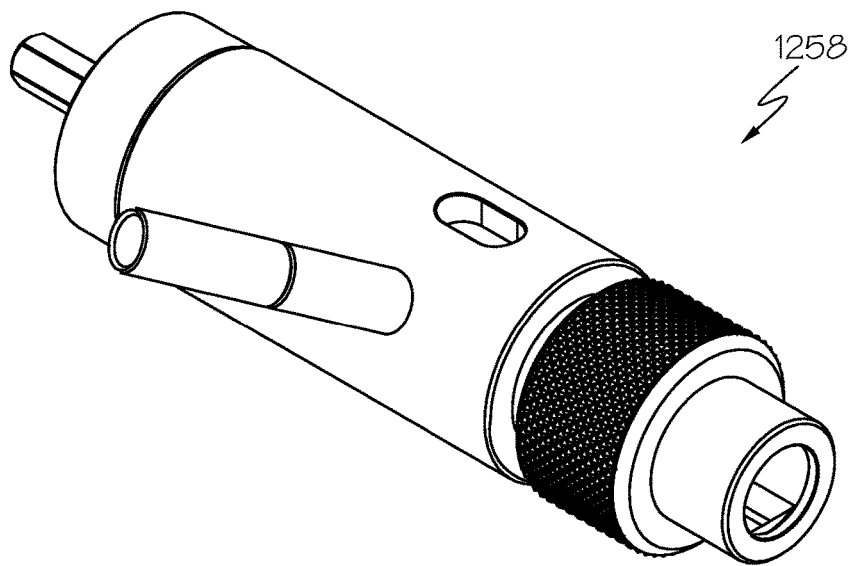
FIG. 12A is a perspective view of a cartridge assembly of a fluid dispense pump system, in accordance with other embodiments.
Figure 12B:
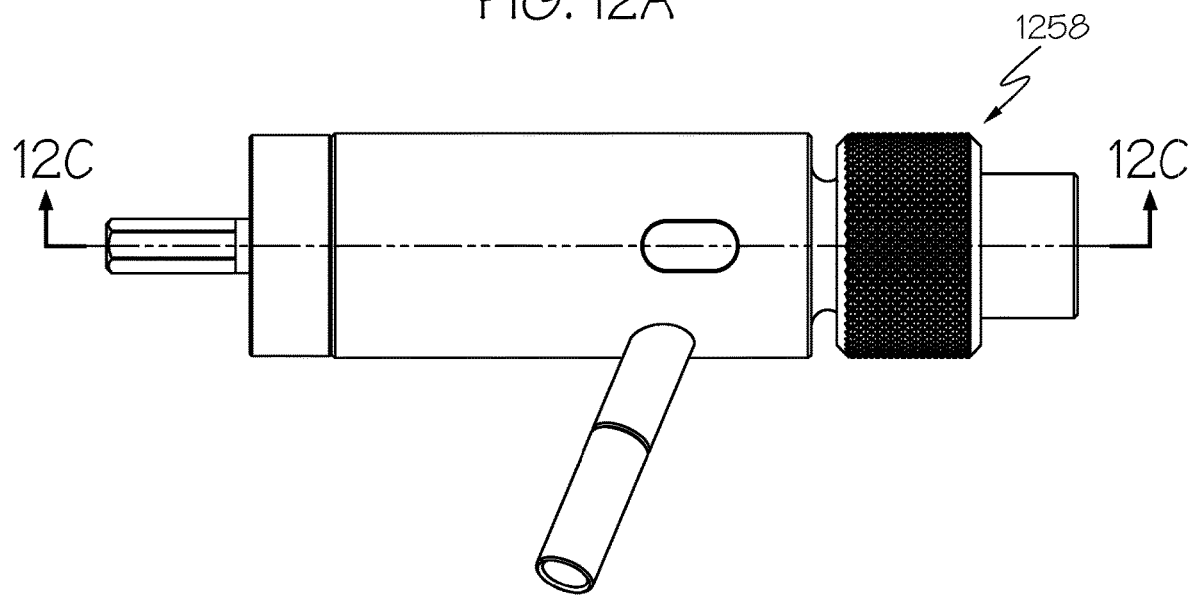
FIG. 12B is a side view of the cartridge assembly of FIG. 12A.
Figure 12C:
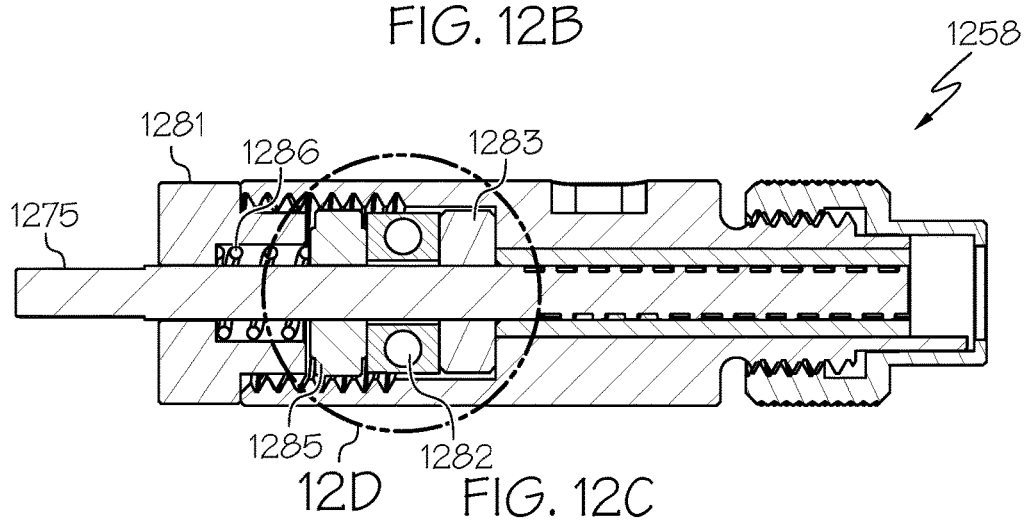
FIG. 12C is a cross-sectional view of the cartridge assembly of FIGS. 12A and 12B.
Figure 12D:
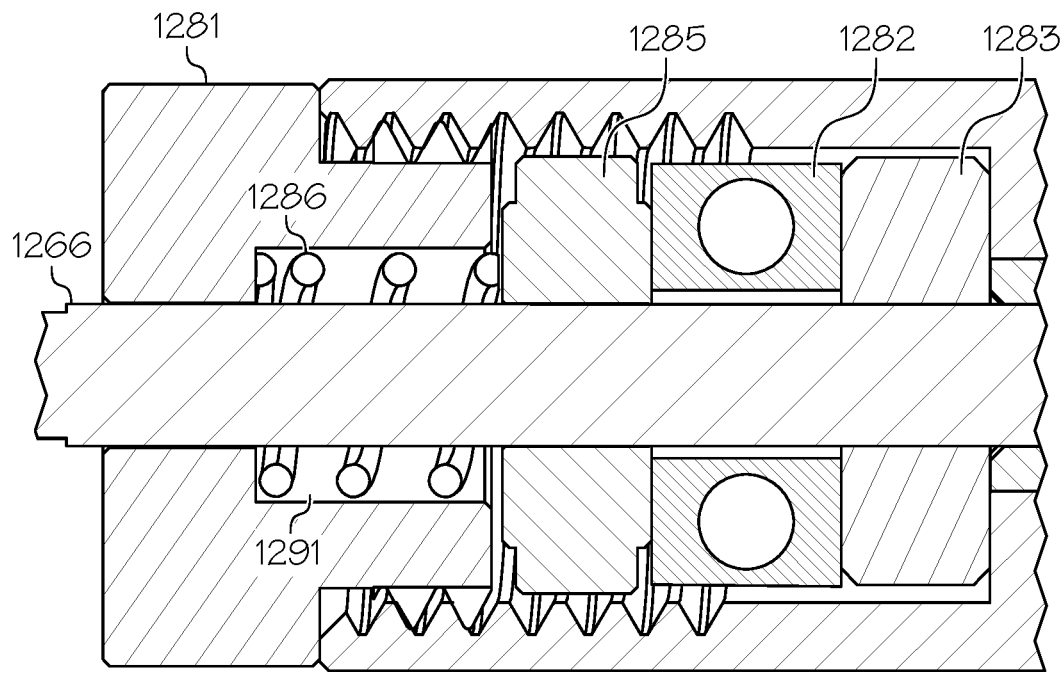
FIG. 12D is an enlarged view of the cross-sectional view of the cartridge assembly of FIGS. 12A-12C.
Figure 12E:
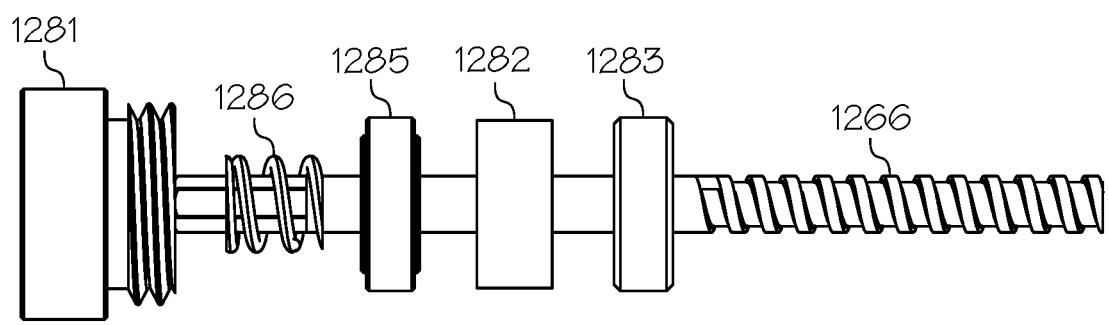
FIG. 12E is a side view of a feed screw assembly of the cartridge assembly of FIGS. 12A-12D.

FIGS. 11A and 11B illustrate an embodiment similar to FIGS. 10A-10E, except for the absence of a load washer between a coil spring 1186 and a ring collar 1192. In particular, the coil spring 1186 is positioned between a threaded spanner nut 1181 and the ring collar 1192. The spanner nut 1181, ring collar 1192, washer element 1183, and coil spring 1186 of the cartridge assembly 1158 can be the same as or similar to those counterpart elements of other embodiments described above, so details thereof are not repeated for brevity.

FIGS. 12A-12E are various views of a cartridge assembly 1258 of a fluid dispense pump system, in accordance with other embodiments. With one notable exception that cartridge assembly 1258 includes a bearing assembly 1282 in lieu of a ring collar, many elements of the cartridge assembly 1258 such as a spanner nut 1281, bearing 1282, coil spring 1286, and feed screw auger 1266 may be similar to or the same as cartridge assembly 1058 of FIGS. 10A-10E, so details thereof are not repeated for brevity.

In some embodiments, the spring-loaded spanner nut assembly includes a standalone coil spring 1286 or other elastic object having a first end positioned in a cavity 1291 of the spanner nut 1281 and an axial force corresponding to a compression load with respect to the spring 1286 by the bearing 1282 or other element of the feed screw assembly 1275. Here, a combination of a closed-loop servo motor 42 (see FIG. 1) and spring 1286 providing a force on the bearing 1282 or the like in a direction of a distal end of the cartridge assembly 1258 permits a consistent flow of fluid material through the cartridge assembly 1258 and corresponding uniform small volumes of the fluid material from the cartridge assembly 1258, notwithstanding the presence of possible radial and/or axial play of components inside the cartridge described herein.

In some embodiments, a load washer 1285 is positioned between the spanner nut 1281 and bearing assembly 1282. Unlike the load washer 1085 in FIGS. 10A-10E, the load washer 1285 here is different than the washer element 1283 in that the washer 1285 in FIGS. 12A-12E communicates with the bearing 1282 so that the inner race and outer race can operate, as described above with respect to bearing assembly 82. For example, although not shown in FIGS. 12A-12E, the bearing assembly 1282 can includes an inner race, an outer race, a cage with a track, and a set of ball bearings or cylindrical rollers or the like positioned in the cage. The load washer 1285 applies a load to the spring 1286 during operation of the feed screw 1266 to provide additional consistency with respect to outputs of the fluid material. In this example, the load washer 1285 may have a "top hat" shape where a first portion of a first diameter, circumference, or other dimension is sufficient to directly abut the outer race ring 302 of the bearing, for example, shown in FIGS. 3A and 3B. A second cylindrical portion extends from the first portion and is of a smaller diameter, circumference, or other dimension for insertion into a counterbore 1291 of the threaded spanner nut.

While the present inventive concepts have been particularly shown and described above with reference to exemplary embodiments thereof, it will be understood by those of ordinary skill in the art, that various changes in form and detail can be made without departing from the spirit and scope of the present inventive concepts.

What is claimed is:

1. A fluid dispense pump, comprising:
   a pump housing;
   a cartridge body positioned along an axis, the cartridge body comprising a chamber and a feed aperture extending through a surface of the cartridge body to the chamber; and
   a feed screw assembly in the chamber of the cartridge body, the feed screw assembly comprising:
   a feed screw;
   a feed screw shaft extending from the feed screw;
   a spanner nut threaded into an interior of the cartridge body, and positioned about the feed screw shaft, the spanner nut coupled to an end of the cartridge body for maintaining the feed screw along a longitudinal axis in the chamber of the cartridge body, the spanner nut having a hole having a first width and a counterbore having a second width greater than the first width;
   a collar about the feed screw shaft between the spanner nut and the feed screw, wherein the collar rotates with the feed screw about the longitudinal axis inside the cartridge body; and
   a load washer having a top surface positioned over the counterbore of the spanner nut and that directly abuts an outermost surface of the spanner nut, and a bottom surface directly abutting the collar.

2. The fluid dispense pump of claim 1, wherein the load washer is formed of a material having greater compression characteristics than the spanner nut.

3. The fluid dispense pump of claim 1, wherein the load washer is formed of an acetal-based or thermoplastic material.

4. The fluid dispense pump of claim 1, further comprising a washer element about the feed screw shaft at an opposite side of collar as the load washer.

5. The fluid dispense pump of claim 4, wherein the washer element has a same material and dimension as the load washer.

6. The fluid dispense pump of claim 1, wherein the collar is a ring collar.

7. The fluid dispense pump of claim 1, the load washer has a first portion of a dimension that directly abuts a surface of the collar and a second portion that extends from the first portion and is of a smaller dimension than the first portion for insertion into the counterbore of the spanner nut.

8. The fluid dispense pump of claim 7, further comprising a spring in the counterbore, wherein the second portion of the load washer applies a force on the spring inside the counterbore.

9. The fluid dispense pump of claim 1, further comprising a recessed set screw extending through a hole in the collar for attachment the feed screw shaft so that the collar rotates with the feed screw shaft.

10. The fluid dispense pump of claim 1, further comprising a clearance between the collar and the spanner nut to allow an uninhibited rotation of the feed screw.

11. The fluid dispense pump of claim 1, wherein the collar is a press-fit collar.

12. A method for assembling a feed screw assembly for a fluid dispense pump, comprising:
    press-fitting a collar about a feed screw shaft;
    positioning a load washer about the feed screw shaft; and
    positioning a spanner nut having a hole having a first width and a counterbore having a second width greater than the first width about the feed screw shaft so that a top surface of the load washer is positioned over the counterbore and directly abuts an outermost surface of the spanner nut, a bottom surface directly abuts the collar, and the collar is separated from the spanner nut by the load washer.

13. A fluid dispense pump, comprising:
    a pump housing;
    a cartridge body positioned along an axis, the cartridge body comprising a chamber and a feed aperture extending through a surface of the cartridge body to the chamber; and
    a feed screw assembly in the chamber of the cartridge body, the feed screw assembly comprising:
    a feed screw;
    a feed screw shaft extending from the feed screw;
    a spanner nut threaded into an interior of the cartridge body, and positioned about the feed screw shaft, the spanner nut coupled to an end of the cartridge body for maintaining the feed screw along a longitudinal axis in the chamber of the cartridge body;

a collar about the feed screw shaft between the spanner nut and the feed screw, wherein the collar rotates with the feed screw about the longitudinal axis inside the cartridge body; and a load washer having a top surface that directly abuts an outermost surface of the spanner nut, and a bottom surface directly abutting the collar, wherein the load washer has a first portion of a dimension that directly abuts a surface of the collar and a second portion that extends from the first portion and is of a smaller dimension than the first portion for insertion into a counterbore of the spanner nut.

\* \* \* \* \*